US012634058B2

(12) United States Patent
Saad et al.

(10) Patent No.: US 12,634,058 B2
(45) Date of Patent: May 19, 2026

(54) MULTI-AP CHANNEL SOUNDING PROCEDURES FOR WLAN SYSTEMS

(71) Applicant: INTERDIGITAL PATENT HOLDINGS, INC., Wilmington, DE (US)

(72) Inventors: Mahmoud Saad, Montreal (CA); Zinan Lin, Basking Ridge, NJ (US); Hanqing Lou, Syosset, NY (US); Xiaofei Wang, North Caldwell, NJ (US); Rui Yang, Greenlawn, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 213 days.

(21) Appl. No.: 18/558,000

(22) PCT Filed: Apr. 29, 2022

(86) PCT No.: PCT/US2022/027033
§ 371 (c)(1),
(2) Date: Oct. 30, 2023

(87) PCT Pub. No.: WO2022/232578
PCT Pub. Date: Nov. 3, 2022

(65) Prior Publication Data
US 2024/0243862 A1    Jul. 18, 2024

Related U.S. Application Data

(60) Provisional application No. 63/280,995, filed on Nov. 18, 2021, provisional application No. 63/245,465, (Continued)

(51) Int. Cl.
*H04L 5/00*         (2006.01)

(52) U.S. Cl.
CPC .................................. *H04L 5/0033* (2013.01)

(58) Field of Classification Search
CPC ..... H04L 5/0033; H04B 7/0621; H04B 7/024; H04B 7/0617; H04W 84/12
See application file for complete search history.

(56)           References Cited

U.S. PATENT DOCUMENTS

2017/0054542 A1    2/2017  Vermani et al.
2017/0111148 A1    4/2017  Park et al.
(Continued)

FOREIGN PATENT DOCUMENTS

EP          3 731 428       10/2020
WO       2019/213565      11/2019

OTHER PUBLICATIONS

Au, "Compendium of straw polls and potential changes to the Specification Framework Document," IEEE 802.11-20/0566r59 (Aug. 2020).

(Continued)

*Primary Examiner* — Kan Yuen
(74) *Attorney, Agent, or Firm* — Volpe Koenig

(57)              ABSTRACT

A method performed by a station (STA) associated with a first access point (AP), wherein the first AP is part of a multi-AP (MAP) set comprising the first AP and at least a second AP, may compromise: receiving, from the second AP that the STA is not associated with, a null data packet announcement (NDPA) frame, the NDPA frame including a Special STA Info field including an association identifier (AID) relating to the association between the STA and the first AP; receiving a null data packet (NDP) frame from the second AP that the STA is not associated with; and transmitting, to the first AP, feedback based on the NDP frame.

16 Claims, 36 Drawing Sheets

Related U.S. Application Data filed on Sep. 17, 2021, provisional application No. 63/194,508, filed on May 28, 2021, provisional application No. 63/182,387, filed on Apr. 30, 2021.

(56)                References Cited

U.S. PATENT DOCUMENTS

| | | | | |
|---|---|---|---|---|
| 2019/0215037 A1* | 7/2019 | Seok | ..................... | H04L 1/0013 |
| 2019/0261369 A1 | 8/2019 | Verma et al. | | |
| 2019/0373569 A1* | 12/2019 | Ram | .................. | H04W 56/005 |
| 2020/0358486 A1 | 11/2020 | Suh et al. | | |
| 2022/0140987 A1 | 5/2022 | Park et al. | | |
| 2023/0086669 A1 | 3/2023 | Yu et al. | | |
| 2024/0195589 A1* | 6/2024 | Lim | ..................... | H04L 5/0094 |
| 2024/0381110 A1* | 11/2024 | Noh | ..................... | H04B 7/0626 |

OTHER PUBLICATIONS

Au, "Specification Framework for TGbe," 802.11-19/1262r8 (Feb. 2020).
Cariou, "802.11 EHT Proposed PAR," IEEE 802.11-18/1231r4 (Jan. 2019).
Cariou, "IEEE 802.11 EHT draft Proposed CSD," IEEE 802.11-18/1233r4 (Jan. 2019).
Chen et al., "Discussions on sensing measurement flows," IEEE 802.11-21/0990r2 (Jun. 2021).
Draft IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely High throughput (EHT), IEEE 802.11be/D1.0 (May 2021).
Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 6: Enhancements for High Efficiency WLAN, IEEE P802.11ax/D6.0 (Nov. 2019).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Speci-
fications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 1: Enhancements for High Efficiency WLAN, IEEE 802.11ax-2021 (Feb. 2021).
Jia et al., "Multi-AP Sounding Discussion," IEEE 802.11-20/0052 (Jan. 2020).
Jiang et al., "Channel Sounding for Multi-AP CBF," IEEE 802.11-20-0123-02-00be (Jan. 2020).
Lim et al., "Non-TB and TB measurement procedure for WLAN sensing," IEEE 802.11-21/1015r2 (Jun. 2021).
Lin et al., "CC36 CR for CID 5675 7793," IEEE 802.11-21/2019r5 (Nov. 2021).
Lin et al., "CC36 CR for CID 6841 6842 6843," IEEE 802.11-21/1243r0 (Jul. 2021).
Liu et al., "Joint Sounding for Multi-AP Systems," IEEE 802.11-19/1593r3 (Sep. 2019).
Yu et al., "Sounding procedure in AP collaboration," IEEE 802.11-19/1097r0 (Jul. 2019).
Chen et al., "Proposed changes for MU type sounding feedback," IEEE 802.11-21/0886r3 (May 13, 2021).
Lee, "D0.3 CR for Spatial Stream And MIMO Enhancement," IEEE 802.11-21/0272r4 (Feb. 18, 2021).

* cited by examiner

| | Frame Control | Duration | RA | TA | Sounding Dialog Token | STA Info 1 | ... | STA Info n | FCS |
|---|---|---|---|---|---|---|---|---|---|
| Octets: | 2 | 2 | 6 | 6 | 1 | 4 | | 4 | 4 |

320
MAC Header

316

302   304   306   308   310   312   314

400

⟶ : In-BSS STA

┄┄┄► : OBSS STA

1100

1300

1302

1304

B0    B10  B11                    B31

| AID11 | Reserved |
|-------|----------|

Bits:      11          21

Explicit Sounding: Compressed BFRP/CQI

Implicit Sounding: CSI Measurement when
Compressed BFRP/CQI in OBSS is Sent $$H_{AP1AP2-STA11} = H_{AP1-STA11} + H_{AP2-STA11}$$

2600

MULTI-AP CHANNEL SOUNDING PROCEDURES FOR WLAN SYSTEMS

CROSS-REFERENCE TO RELATED APPLICATIONS

This application is the U.S. National Stage, under 35 U.S.C. § 371, of International Application No. PCT/US2022/027033 filed Apr. 29, 2022, which claims the benefit of U.S. Provisional Application No. 63/182,387, filed Apr. 30, 2021, U.S. Provisional Application No. 63/194,508, filed May 28, 2021, U.S. Provisional Application No. 63/245,465, filed Sep. 17, 2021, and U.S. Provisional Application No. 63/280,995, filed Nov. 18, 2021 the contents of which are incorporated herein by reference.

SUMMARY

Methods and apparatuses for multi-AP channel sounding for WLAN systems are disclosed. A method performed by a station (STA) associated with a first access point (AP), wherein the first AP is part of a multi-AP (MAP) set comprising the first AP and at least a second AP, may compromise: receiving, from the second AP that the STA is not associated with, a null data packet announcement (NDPA) frame, the NDPA frame including a Special STA Info field including an association identifier (AID) relating to the association between the STA and the first AP; receiving a null data packet (NDP) frame from the second AP that the STA is not associated with; and transmitting, to the first AP, feedback based on the NDP frame.

The receiver may be further configured to receive a beamforming report poll (BFRP) from the second AP that the STA is not associated with. The feedback based on the NDP frame is beamforming report. The STA may be participating in a multi-AP channel sounding procedure. The Special STA Info field may include a Number of APs subfield that indicates the number of APs involved in the multi-AP channel sounding procedure. The Special STA Info field may include a Number of STAs from AP subfield that indicates the number of STAs involved in the multi-AP channel sounding procedure. The Number of STAs from AP subfield may indicate an absolute number of STAs involved in the multi-AP channel sounding procedure. The Number of STAs from AP subfield may indicate a relative number of STAs involved in the multi-AP channel sounding procedure.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 1C is a system diagram illustrating an example radio access network (RAN) and an example core network (CN) that may be used within the communications system illustrated in FIG. 1A according to an embodiment;

FIG. 1D is a system diagram illustrating a further example RAN and a further example CN that may be used within the communications system illustrated in FIG. 1A according to an embodiment;

DETAILED DESCRIPTION

Figure 1A:
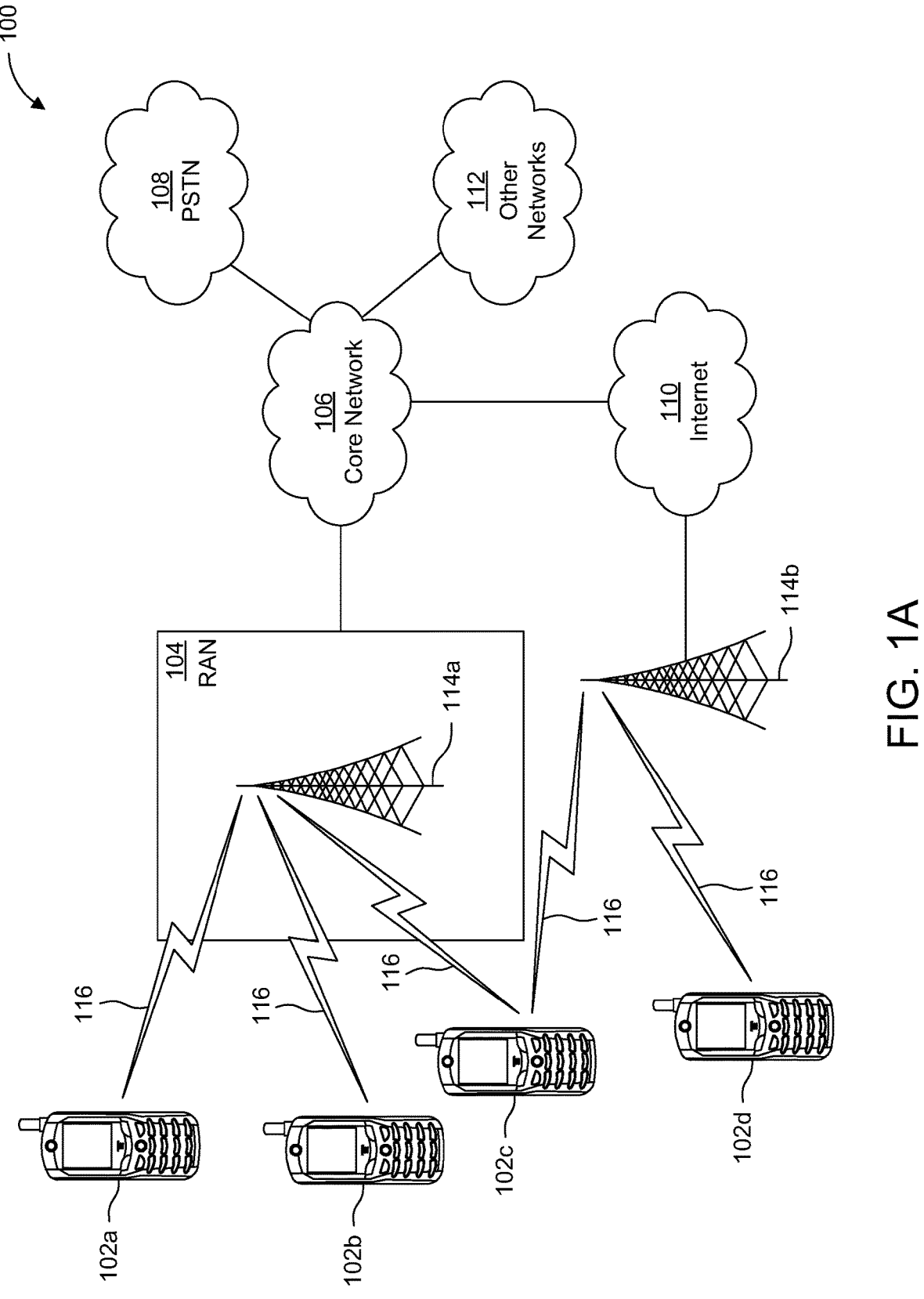
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
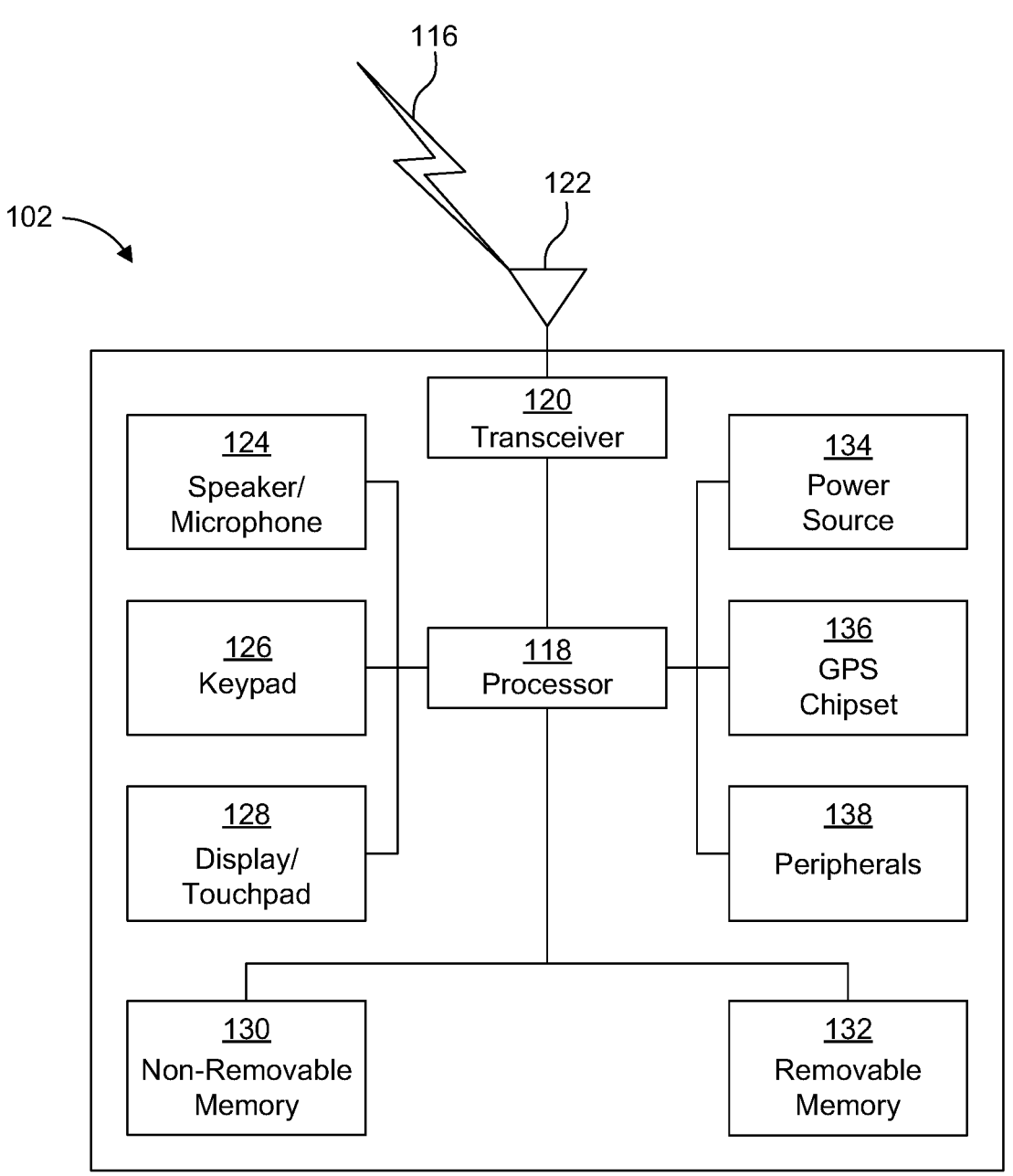
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
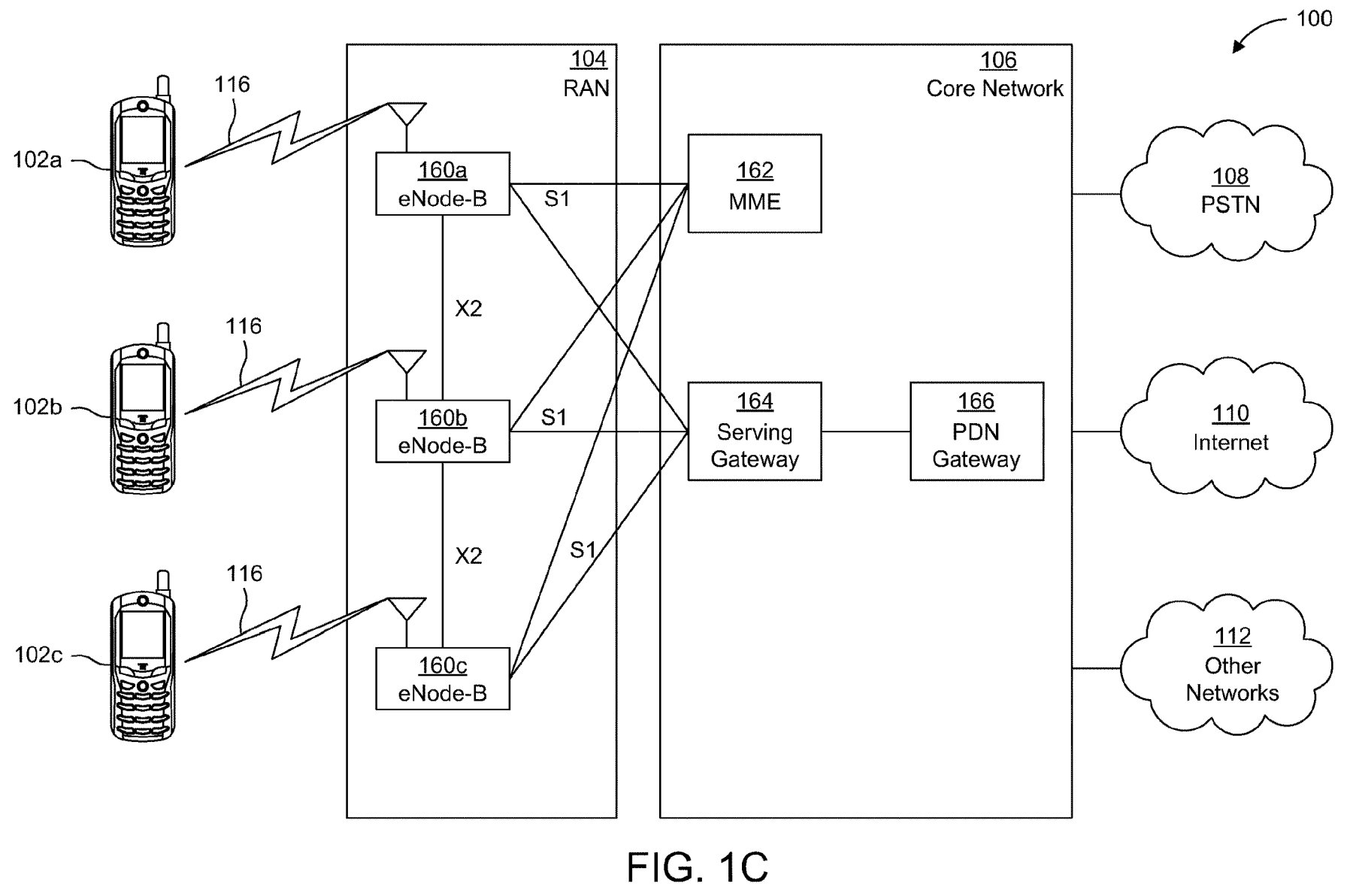

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
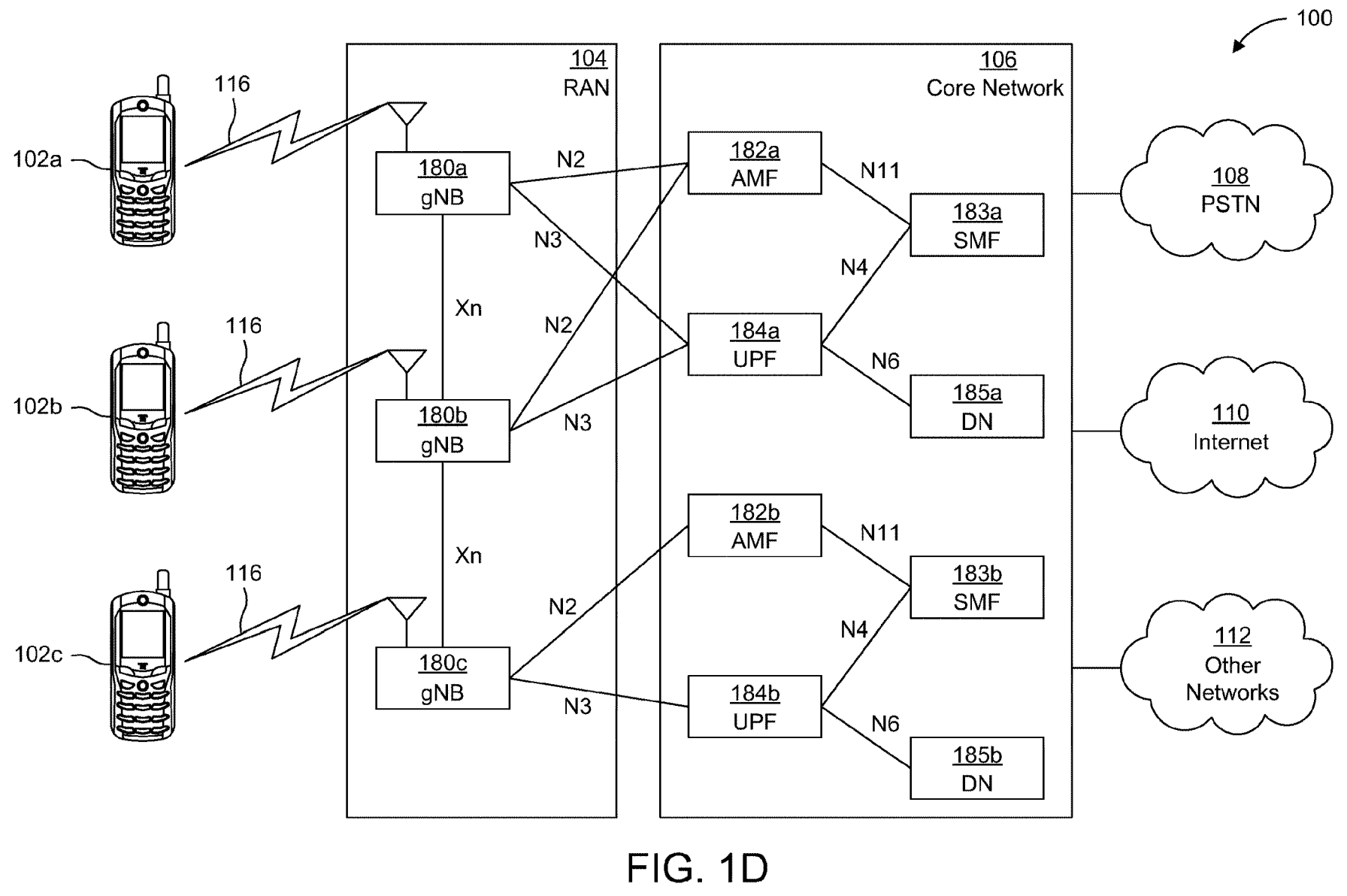

FIG. 1D is a system diagram illustrating the RAN 104 and the CN 106 according to an embodiment. As noted above, the RAN 104 may employ an NR radio technology to communicate with the WTRUs 102*a*, 102*b*, 102*c* over the air interface 116. The RAN 104 may also be in communication with the CN 106.

The RAN 104 may include gNBs 180*a*, 180*b*, 180*c*, though it will be appreciated that the RAN 104 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A WLAN in Infrastructure Basic Service Set (BSS) mode has an Access Point (AP) for the BSS and one or more stations (STAs) associated with the AP. The AP typically has access or interface to a Distribution System (DS) or another type of wired/wireless network that carries traffic in and out of the BSS. Traffic to STAs that originates from outside the BSS arrives through the AP and is delivered to the STAs. Traffic originating from STAs to destinations outside the BSS is sent to the AP to be delivered to the respective destinations. Traffic between STAs within the BSS may also be sent through the AP where the source STA sends traffic to the AP and the AP delivers the traffic to the destination STA Using the 802.11ac infrastructure mode of operation, the AP may transmit a beacon on a fixed channel, usually the primary channel. This channel may be 20 MHz wide, and is the operating channel of the BSS. This channel is also used by the STAs to establish a connection with the AP. The fundamental channel access mechanism in an 802.11 system is Carrier Sense Multiple Access with Collision Avoidance (CSMA/CA). In this mode of operation, every STA, including the AP, may sense the primary channel. If the channel is detected to be busy, the STA backs off. Hence only one STA may transmit at any given time in a given BSS.

In 802.11n, High Throughput (HT) STAs may also use a 40 MHz wide channel for communication. This is achieved by combining the primary 20 MHz channel, with an adjacent 20 MHz channel to form a 40 MHz wide contiguous channel.

In 802.11ac, Very High Throughput (VHT) STAs may support 20 MHz, 40 MHz, 80 MHz, and 160 MHz wide channels. The 40 MHz, and 80 MHz, channels are formed by combining contiguous 20 MHz channels similar to 802.11n described above. A 160 MHz channel may be formed either by combining 8 contiguous 20 MHz channels, or by combining two non-contiguous 80 MHz channels, which may also be referred to as an 80+80 configuration. For the 80+80 configuration, the data, after channel encoding, is passed through a segment parser that divides it into two streams. The Inverse Discrete Fourier Transformation (IDFT) operation and time domain processing are done on each stream separately. The streams are then mapped on to the two channels, and the data is transmitted. At the receiver, this mechanism is reversed, and the combined data is sent to the MAC.

To improve spectral efficiency 802.11ac has introduced the concept for downlink Multi-User MIMO (MU-MIMO) transmission to multiple STA's in the same symbol's time frame, e.g., during a downlink OFDM symbol. The potential for the use of downlink MU-MIMO is also currently considered for 802.11ah. It is important to note that since downlink MU-MIMO, as it is used in 802.11ac, uses the same symbol timing to multiple STA's interference of the waveform transmissions to multiple STA's is not an issue. However, all STA's involved in MU-MIMO transmission with the AP must use the same channel or band, this limits the operating bandwidth to the smallest channel bandwidth that is supported by the STA's which are included in the MU-MIMO transmission with the AP.

The IEEE 802.11 Extremely High Throughput (EHT) Study Group was formed in September 2018. EHT is considered as the next major revision to IEEE 802.11 standards following 802.11ax. EHT is formed to explore the possibility to further increase peak throughput and improve efficiency of the IEEE 802.11 networks. Following the EHT Study Group, the 802.11be Task Group was established to provide for 802.11 EHT specifications. The primary use cases and applications addressed include high throughput and low latency applications such as: Video-over-WLAN, Augmented Reality (AR) and Virtual Reality (VR).

A list of features discussed with respect to EHT SG and 802.11be to achieve the target of increased peak throughput and improved efficiency include: multiple access point (Multi-AP) Coordination, Multi-Band/multi-link; 320 MHz bandwidth, 16 Spatial Streams, HARQ, new designs for 6 GHz channel access and 802.11be Multi-AP transmission.

The IEEE Standard board approved the IEEE 802.11be Task Group (TG) based on a Project Authorization Request (PAR) and Criteria for Standards Development (CSD) developed in the EHT SG. Coordinated Multi-AP (C-MAP) transmissions may be supported in 802.11be. The schemes having been discussed include: Coordinated Multi-AP OFDMA (co-OFDMA), Coordinated Multi-AP TDMA (co-TDMA), Coordinated Multi-AP Spatial Reuse (CSR), Coordinated beamforming/nulling (CBF) and Joint Transmission (JTX).

In the context of coordinated Multi-AP, several terminologies have been defined. A sharing AP is an EHT AP which obtains a TXOP and initiates the multi-AP coordination. A shared AP is an EHT AP which is coordinated for the multi-AP transmission by the sharing AP. An AP candidate set is a set of APs that may initiate or participate in multi-AP coordination.

It has been agreed that 802.11be define a mechanism to determine whether an AP is part of an AP candidate set and may participate as a shared AP in coordinated AP transmission initiated by a sharing AP. A procedure should be defined for an AP to share its frequency/time resources of an obtained TXOP with a set of APs. An AP that intends to use the resource (i.e., frequency or time) shared by another AP shall be able to indicate its resource needs to the AP that shared the resource. Coordinated OFDMA is supported in 11be, and in a coordinated OFDMA, both DL OFDMA and its corresponding UL OFDMA acknowledgement are allowed.

Channel sounding in 802.11n and 802.11ac may be performed using two different schemes—explicit or implicit. In explicit channel sounding, the AP transmits an NDP to the STA with a preamble that allows the STA to measure its own channel and send Channel State Information (CSI) feedback to the AP. In implicit channel sounding, the STA sends an NDP, and the AP measures the channel of the STA assuming that the channel is reciprocal.

In the 802.11be TG, it has been agreed that 802.11be support a maximum of 16 spatial streams for SU-MIMO and for MU-MIMO where the maximum number of spatial streams allocated to each MU-MIMO scheduled non-AP STA is limited to 4 and that the maximum number of users spatially multiplexed for DL transmissions is 8 per RU/MRU.

802.11be supports two modes of channel sounding in multi-AP environments including sequential sounding and joint sounding. In sequential sounding, each AP transmits an NDP independently without overlapped sounding period of each AP. Also, it is agreed that joint sounding also be provided as an optional mode for Multiple-AP, where less or equal to total 8 antennas at AP has all antennas active on all LTF tones and uses 82.11ax P-matrix across OFDM symbols. The CSI feedback collection may be performed using 802.11ax-like 4 step sounding sequence (NDPA+NDP+ BFRP TF+CSI report) in Multiple-AP to collect the feedback from both in-BSS and overlapping basic service set (OBSS) STAs. It is also agreed that in sequential sounding for Multiple-AP, an STA may process the NDPA frame and the BFRP Trigger frames received from the OBSS AP. The STA may respond with the corresponding CSI to the OBSS AP, if polled by the BFRP Trigger frame from the OBSS AP.

Figure 2:
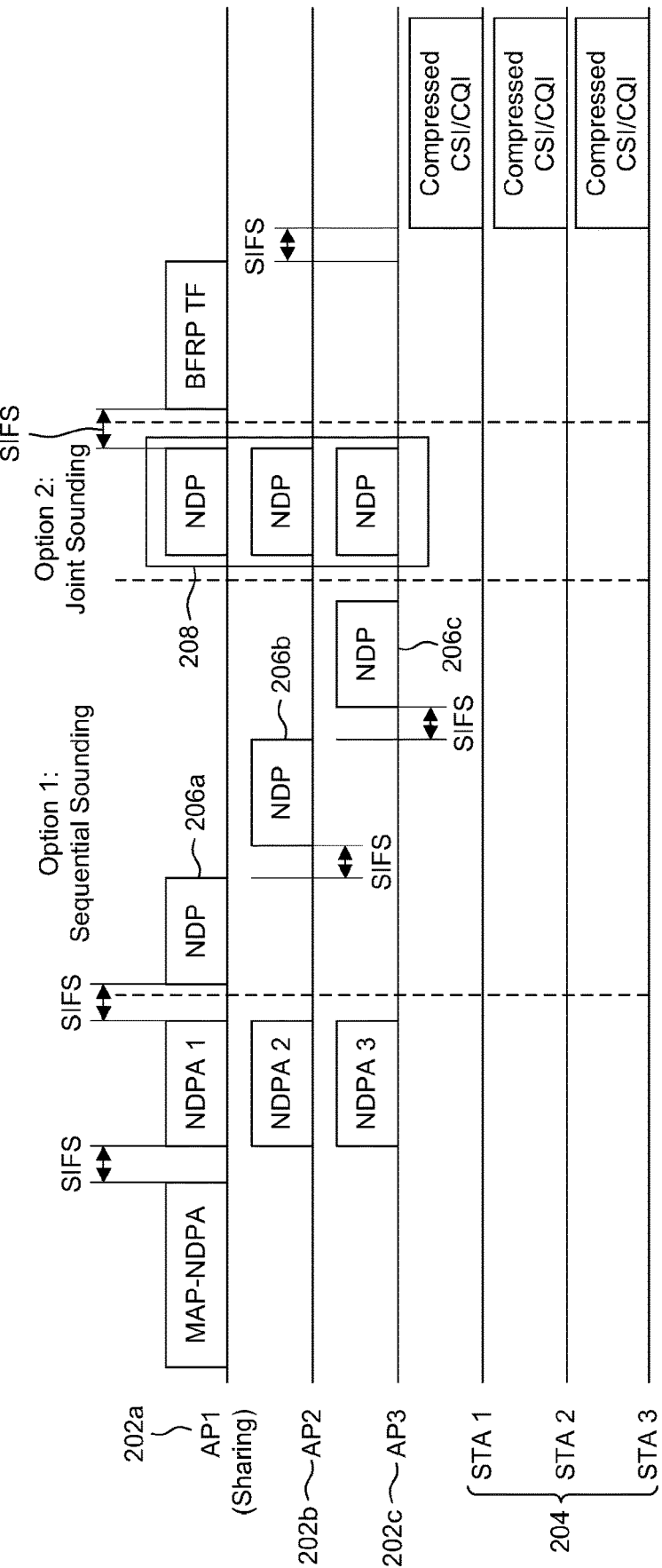
FIG. 2 is a system diagram illustrating sequential versus joint channel sounding in a multiple access point (Multi-AP) environment.

FIG. 2 is a system diagram illustrating sequential versus joint channel sounding in a multiple access point (Multi-AP) environment. In sequential sounding, each AP (i.e., AP1 202a, AP2, 202b, and AP3 202c) in the coordinating group transmits an NDP 206a, 206b, and 206c in a different non-overlapped time to all the STAs 204 in the coordinating group (i.e., time-multiplexed). In joint sounding, the coordinated APs (i.e., AP1 202a, AP2, 202b, and AP3 202c) may transmit the NDP 208 simultaneously where different LTF tones are either spanning the entire bandwidth and multiplexed spatially or using orthogonal codes or otherwise the LTF tones are only sent on selected tones for each AP.

When a STA receives an NDP, it measures the channel and prepares the CSI feedback report. Different ways are proposed to collect the CSI from the STAs including: (1) each AP collects all CSI which includes the feedback of the in-BSS and OBSS stations; (2) each AP collects CSI from its associated STAs only; and/or (3) the Sharing AP collects the CSI for all the Shared APs in the coordination group.

In general, the challenges of channel sounding in Multi-AP environments are that STAs involved in the sounding cannot hear the Sharing AP; synchronization of APs in the Multi-AP coordinating set; overhead, complexity and performance of different sounding scheme varies; variants of NDP transmission in explicit and implicit sounding; feedback collection and reduction.

Figure 3:
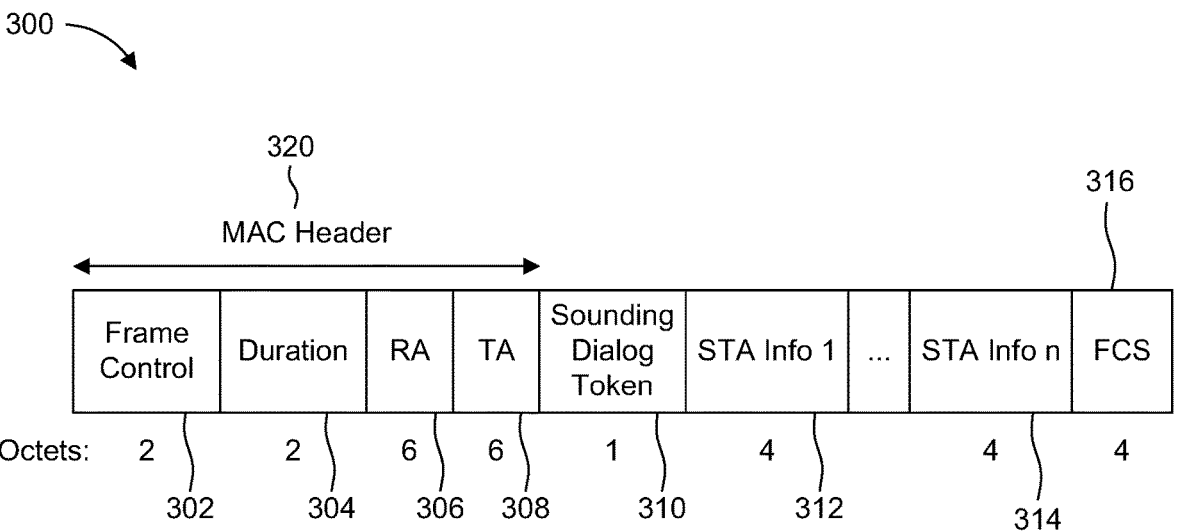
FIG. 3 is a diagram illustrating a high efficiency null data packet (HE NDP) Announcement frame format.

FIG. 3 is a diagram illustrating a high efficiency null data packet (HE NDP) Announcement frame 300 format. As shown in FIG. 3, the 802.11be TG has agreed to keep the structure of the NDP Announcement (NDPA) similar to the NDPA of 802.11ax. The HE NDP Announcement frame 300 may include a Frame Control field 302, Duration field 304, RA field 306, TA field 308, Sounding Dialog Token field 310, STA Info field 312, STA Info n field 314, and FCS field 316. The Frame Control field 302 may be 2 octets. The Duration field 304 may be 2 octets. The RA field 306 may be 6 octets. The TA field 308 may be 6 octets. The Sounding Dialog Token field 310 field may be 1 octet. The STA Info 1 field 312 and STA Info n field 314 may be 4 octets. The FCS field 316 may be 4 octets. The Frame Control field 302, Duration field 304, RA field 306, and TA field 308 may constitute a MAC header 320.

Figure 4:
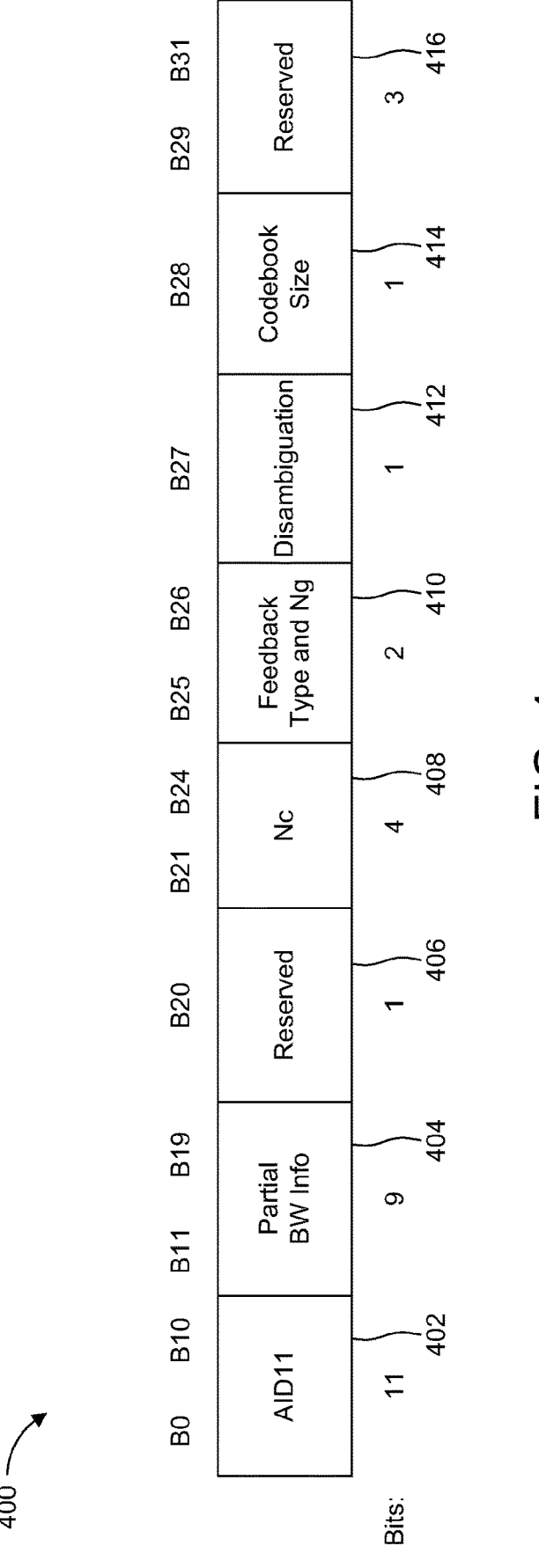
FIG. 4 is a diagram illustrating a STA Info field format in an EHT NDP Announcement frame.

FIG. 4 is a diagram illustrating a STA Info field 400 format in an EHT NDP Announcement frame. The 802.11be TG has agreed to keep the structure of the NDP Announcement (NDPA) similar to the NDPA of 802.11ax as illustrated in FIG. 3. However, the STA Info field depicted in FIG. 4 is changed to accommodate the new features of EHT.

As shown in FIG. 4, the STA Info field 400 format in an EHT NDP Announcement frame may include an Associated ID (AID) 11 subfield 402, Partial BW Info subfield 404, Reserved subfield 406, Nc subfield 408, Feedback Type and Ng subfield 410, Disambiguation subfield 412, Codebook Size subfield 414, and Reserved subfield 416. The AID11 subfield 402 may be 11 bits. The Partial BW Info subfield 404 may be 9 bits. The Reserved subfield 406 may be 1 bit. The Nc subfield 408 may be 4 bits. The Feedback Type and Ng subfield 410 may be 2 bits. The Disambiguation subfield 412 may be 1 bit. The Codebook Size subfield 414 may be 1 bit. The Reserved subfield 416 may be 3 bits.

Figure 5:
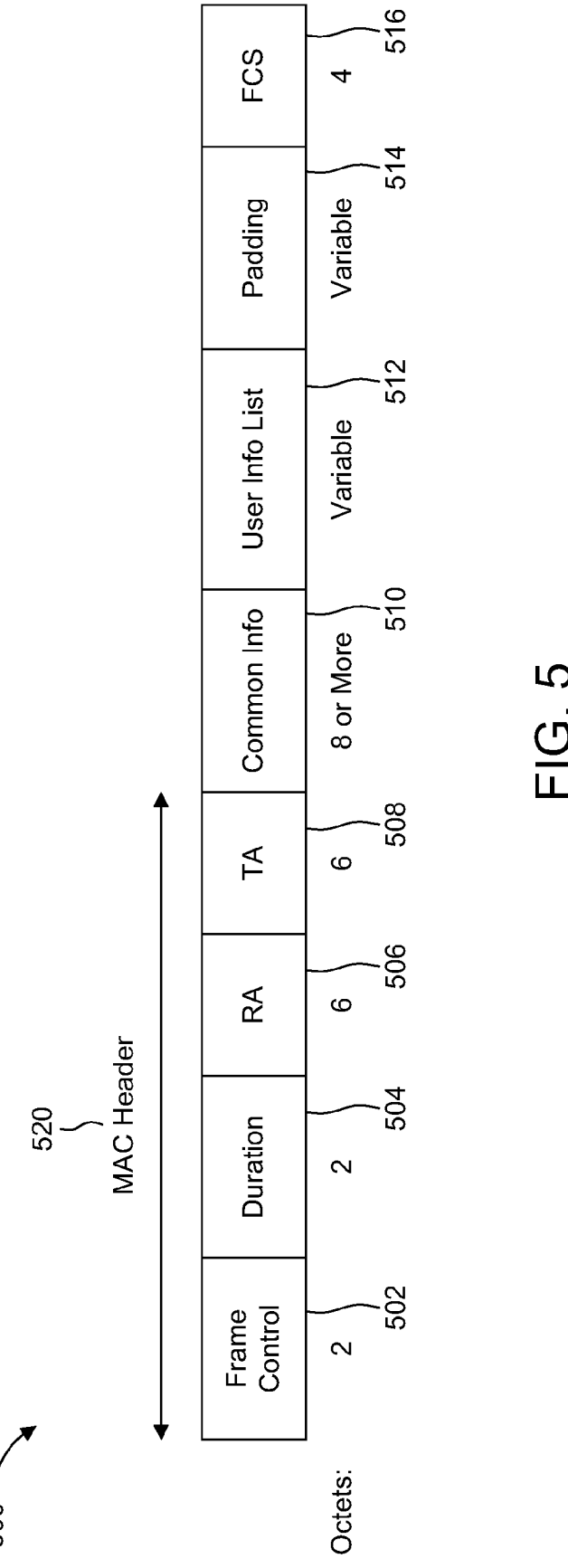
FIG. 5 is a diagram illustrating a Trigger Frame format.

FIG. 5 is a diagram illustrating a Trigger Frame format 500. A trigger frame was introduced firstly in 802.11ax to allocate resources and trigger single or multi-user access in the uplink. As shown in FIG. 5, the Trigger Frame format 500 may include a Frame Control field 502, Duration field 504, RA field 506, TA field 508, Common Info field 510, User Info List field 512, Padding field 514, and FCS field 516. The Frame Control field 502, Duration field 504, RA field 506, and TA field 508 may compromise the MAC header 520. The Frame Control field 502 may be 2 octets. The Duration field 504 may be 2 octets. The RA field 506 may be 6 octets. The TA field 508 may be 6 octets. The Common Info field 510 may be 8 or more octets. The User Info List field 512 and Padding field 514 may be variable octets. The FCF field 516 may be 4 octets.

Figure 6:
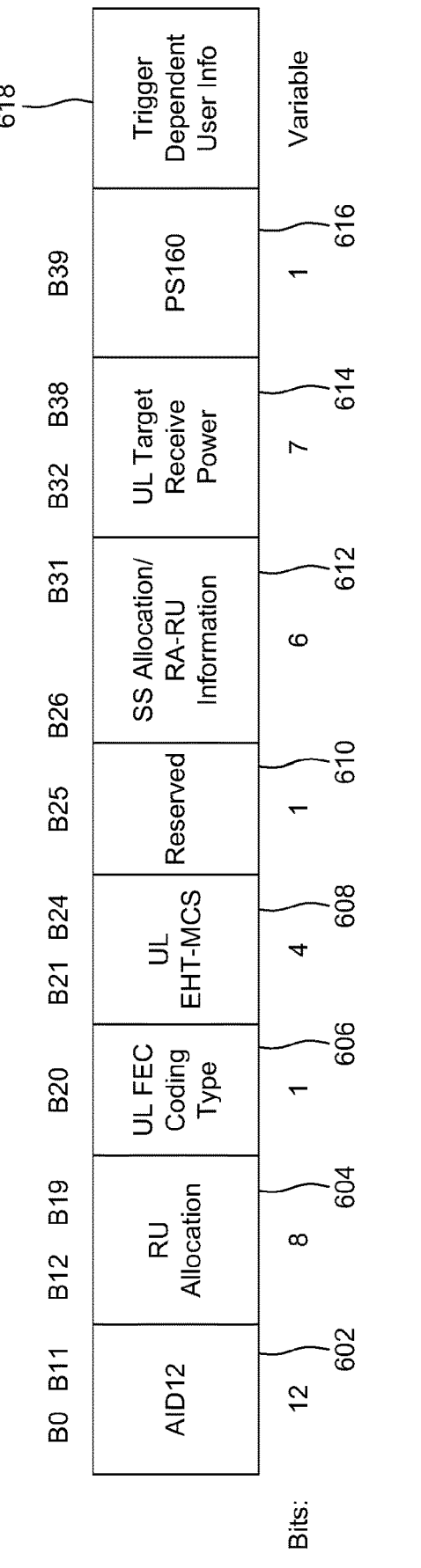
FIG. 6 is a diagram illustrating an EHT Variant User Info field format.
Figure 7:
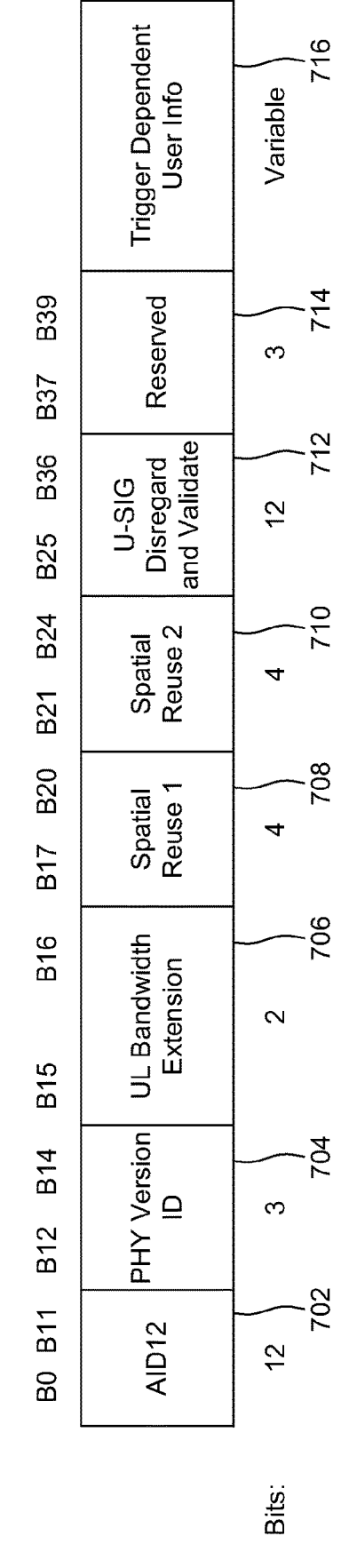
FIG. 7 is a diagram illustrating an EHT Special User Info field format.

FIG. 6 is a diagram illustrating an EHT Variant User Info field format 600 and FIG. 7 is a diagram illustrating an example of a EHT Special User Info field 700 format. Both enhancements as illustrated in FIG. 6 and FIG. 7 provide a unified triggering scheme for both HE and EHT devices.

The EHT Variant User Info field format 600 may include an AID12 field 602, RU Allocation subfield 604, UL FES Coding Type subfield 606, UL EHT-MCS subfield 608, Reserved subfield 610, SS Allocation/RA-RU Information subfield 612, UL Target Receive Power subfield 614, PS160 subfield 616, and Trigger Dependent User Info subfield 618. The AID12 subfield 602 may be 12 bits. The RU Allocation subfield 604 may be 8 bits. The UL FES Coding Type subfield 606 may be 1 bit. The UL EHT-MCS subfield 608 may be 4 bits. The Reserved subfield 610 may be 1 bit. The SS Allocation/RA-RU Information subfield 612 may be 6 bits. The UL Target Receive Power subfield 614 may be 7 bits. The PS160 subfield 616 may be 1 bit. The Trigger Dependent User Info subfield 618 may be variable bits.

FIG. 7 is a diagram illustrating an EHT Special User Info field 700 format. The EHT Special User Info field 700 may include an AID12 subfield 702, PHY Version ID subfield 704, UL Bandwidth Extension subfield 706, Spatial Reuse 1 subfield 708, Spatial Reuse 1 subfield 710, U-SIG Disregard and Validate subfield 712, Reserved subfield 714, and Trigger Dependent User Info subfield 716. The AID12 subfield 702 may be 12 bits. The PHY Version ID subfield 704 may be 3 bits. The UL Bandwidth Extension subfield 706 may be 2 bits. The Spatial Reuse 1 subfield 708 may be 4 bits. The Spatial Reuse 2 subfield 710 may be 4 bits. The U-SIG Disregard and Validate subfield 712 may be 12 bits. The Reserved subfield 714 subfield may be 3 bits. The Trigger Dependent User Info subfield 716 may be variable bits.

In an environment where Multi-AP transmission is enabled, identifying the potential coordination opportunities may be an essential procedure before channel sounding and data transmission procedures. This pre-selection phase may require coarse radio measurements to spot the coordination opportunities. The radio measurement phase shall be immediately before Multi-AP channel sounding and data transmission phases. Several procedures may be devised for the radio measurement phase.

An NDPA may signal OBSS STAs. In Multi-AP Channel Sounding, each AP participating in the sounding round may send a NDPA to signal the CSI feedback parameters to the STAs involved in the sounding whether they are associated with the AP or associated with the OBSS AP. Signaling the OBSS STAs in the NDPA frame is an open problem where several issues may emerge including the indication that the NDPA frame contains STA Info for STAs from OBSS, the identification of the STAs associated to other OBSS, and the AID collision where several STAs from different BSSs may have the same AID.

Multi-AP channel sounding may employ hybrid sounding. In Multi-AP operation, each AP may not only need to know the Channel State Information (CSI) to the STAs within its BSS, but it may also need to know the CSI to the STAs in OBSS. Using explicit sounding for all STAs in the BSSs that associated to the APs in an AP candidate set could lead to significant amount of overhead in terms of signaling and time. How to coordinately utilize a combination of explicit sounding and implicit sounding to reduce the overhead is an open problem.

An NDP should be enhanced for multi-AP (MAP) channel sounding. The current design of an NDP cannot support multi-AP channel sounding. For example, the NDP may be sent from multiple APs where each AP may have different BSS colors. There are multiple ways to send EHT-LTF symbols from different APs in one NDP. It requires the signaling to indicate which EHT-LTF symbol is sent by which AP. There may be more than one mechanism to realize the orthogonality from different APs using one EHT-LTF symbol. Therefore, there may be a need to indicate the orthogonality mechanism used in joint multi-AP sounding.

In one MAP operation scenario, one set of data may be transmitted from multiple APs which may be connected via wired or wireless backhaul. In this scenario, only combined CSI from multiple APs may be needed. In addition, obtaining combined CSI, rather CSI for each Tx-Rx pair, may be sufficient for certain wireless sensing application. A mechanism to achieve such a sounding is currently not available in 802.11 standard.

Some features of EHT may be reused in future amendments to introduce other functionalities to the realm of 802.11. To enable the future use of these features, some MAC frames (such as NDPA and Trigger frames) may be redesigned in EHT to ensure forward compatibility with future amendments (such as SENS). In this way, EHT MAC frames may be used in future amendments to signal essential information.

Implicit sounding is a sounding procedure where a STA (AP or non-AP) solicit another STA (AP or non-AP) to send an NDP such that the soliciting STA may measure the CSI to be used either for communication purposes (beamforming, link adaptation, etc.) or for sensing purposes. Implicit sounding in 802.11 is defined for soliciting NDP transmission from one STA at a time. Triggering more than one STA to send the NDP (orthogonal or non-orthogonal) in the uplink is an open problem. NDPA may be redesigned to provide triggering functionality such that it may be used to trigger multiple STAs to send the NDP simultaneously.

In MAP sounding, the Sharing AP may need to trigger the Shared APs to send NDPAs and NDPs to the STAs in the MAP coordinating group. The Sharing AP may trigger the MAP sounding procedure by using a MAP Trigger frame or a JOINT NDPA frame. Either way, the design of a triggering frame to the MAP sounding procedure is required.

Potential coordination opportunities in Multi-AP transmission may be identified. In an embodiment, radio measurements may be used for the preselection of APs and STAs participating in the channel sounding phase.

Figure 8:
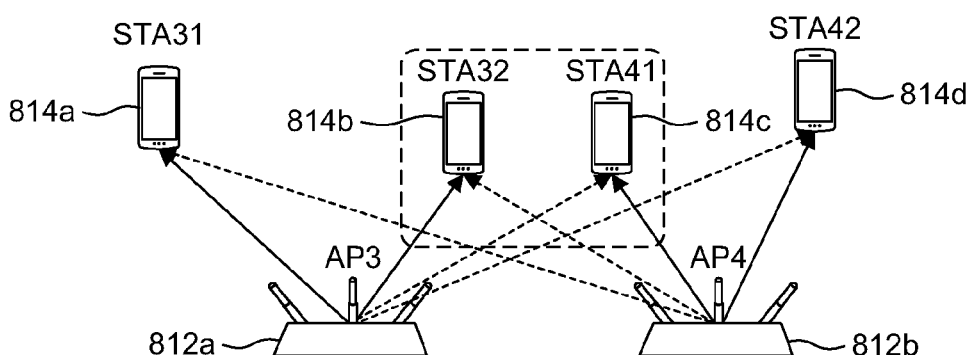
FIG. 8 is a system diagram illustrating an identification of potential coordination opportunities.
Figure 8:
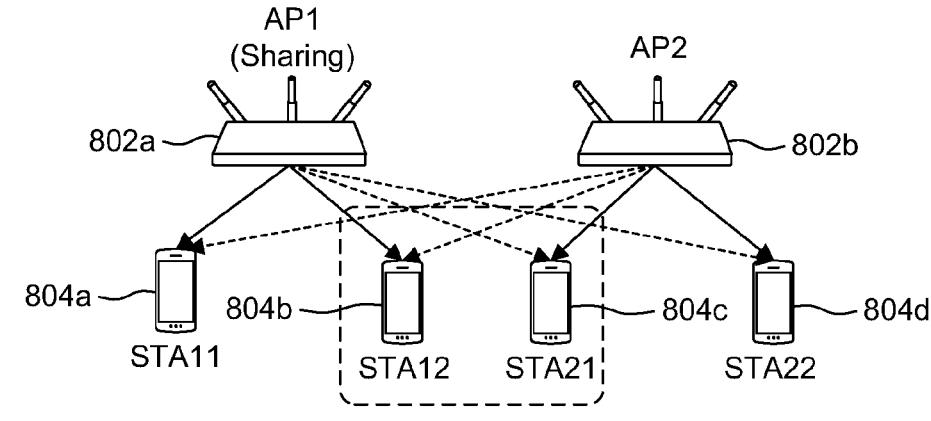

FIG. 8 is a system diagram illustrating an identification of potential coordination opportunities. The identification of potential coordination opportunities in the Multi-AP coordination group may allow for the optimization of the sounding procedure by avoiding unnecessary overhead. The STA11 804*a* and STA12 804*b* are in-BSS with the AP1 802*a* and OBSS with AP2 802*b*. STA21 804C is in-BSS with AP2 802*b* and OBSS with AP1 802*a*. STA22 804*d* is in-BSS with AP2 802*b* and OBSS with AP1 802*a*. The STA31 814*a* is in-BSS with AP3 812*a* and OBSS with AP4 812*b*. STA32 814*b* is in-BSS with AP3 812*a* and OBSS with AP4 812*b*. STA41 814*c* is in-BSS with AP4 812*d* and OBSS with AP3 812*c*. STA41 814*d* is in-BSS with AP4 812*d* and OBSS with AP3 812*c*.

As shown in FIG. 8, applying a preselection radio measurement phase may result in spotting the potential coordination between AP1 802*a* and AP2 802*b* to transmit data from AP1 802*a* to STA12 804*b* and from AP2 802*b* to STA21 804*c* while avoiding excessive interference to the STAs from the other AP. The preselection radio measurement phase may also allow for minimizing the overhead and complexity associated with Multi-AP channel sounding. For example, the coordination opportunity between AP1 802*a* and AP2 802*b* is nonoverlapping with the coordination opportunity between AP3 812*a* and AP4 812*b*. Accordingly, the Multi-AP channel sounding may be planned by the Sharing AP (AP1 802*a*) to avoid sending CSI feedback between STAs involved in one coordination opportunity and any of the APs involved in any other nonoverlapped coordination opportunity.

Figure 9:
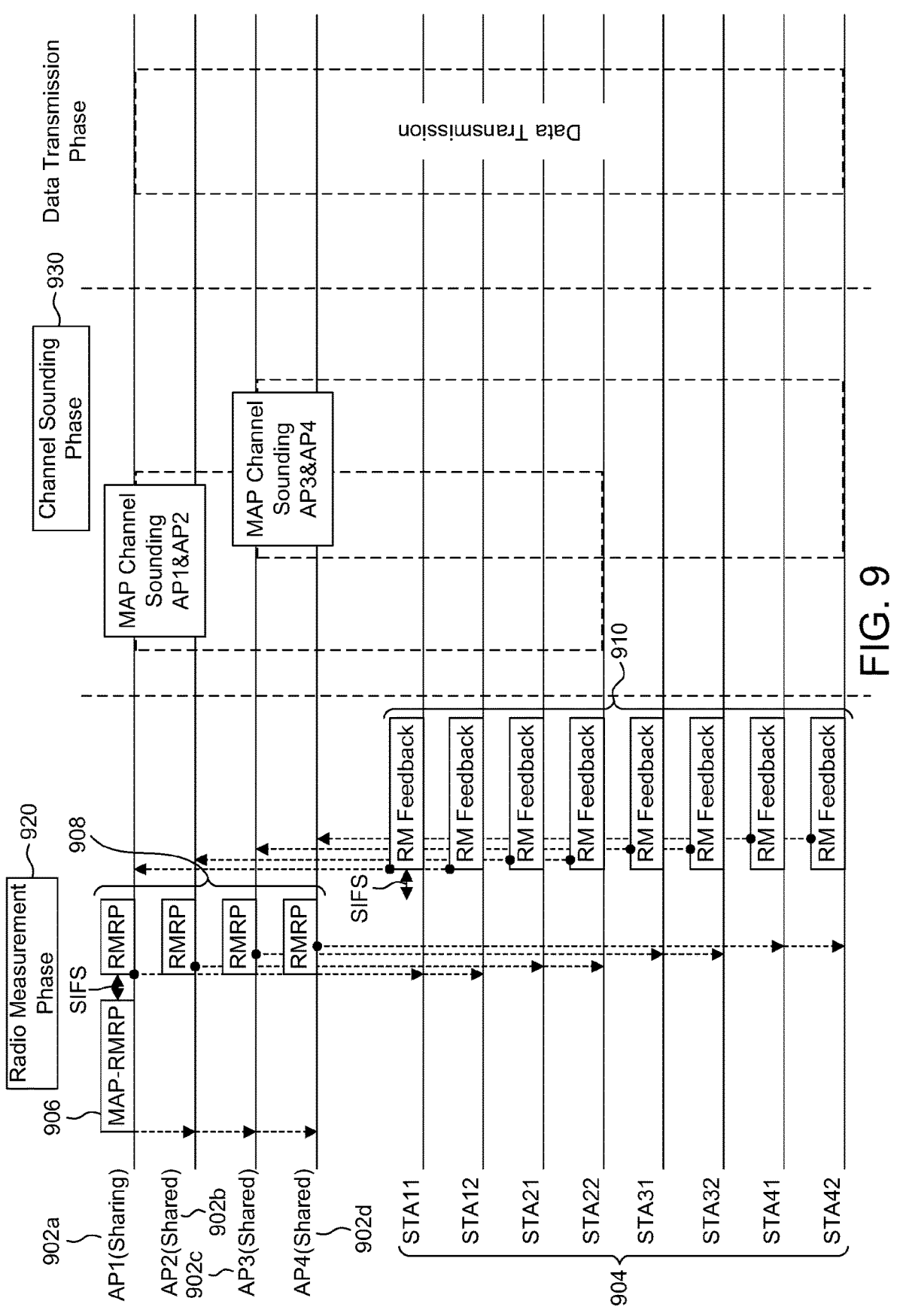
FIG. 9 is a diagram illustrating a preselection radio measurement procedure.

FIG. 9 is a diagram illustrating an example of a preselection radio measurement procedure 920. In the preselection radio measurement phase 920, as depicted in FIG. 9, the Sharing AP 902*a* may send a Multi-AP-Radio Measurement Report Poll (MAP-RMRP) 906 to the shared APs 902*b*, 902*c*, and 902*d* to trigger a radio measurement phase.

Subsequently, all Shared APs 902*b*, 902*c*, and 902*d* in the Multi-AP coordinating group may respond by sending an RMRP 908 to its associated STAs 904 where RMRP 908 and MAP-RMRP 906 may be variants of the trigger frame. In one option, each STA may respond by sending the RM feedback 910 to its AP in the RU allocated by the AP in RMRP 908. All Shared APs 902*b*, 902*c*, 902*d* may then send the collected feedback to the Sharing AP 902*a* either using wired transmission or over-the-air transmission. Alternatively, or additionally, the associated STAs 904 may respond by sending the RM feedback 910 directly to the Sharing AP 902*a*. The Sharing AP 902*a* may analyze the collected radio measurements to identify victim STAs (STAs experiencing high interference from certain APs) and prepare for Multi-AP channel sounding phase 930 which involve the STAs identified as victim STAs. The Multi-AP channel sounding of nonoverlapping coordination opportunities is disjoint and may take place in parallel. The analysis of the RM feedback 910 may allow the Sharing AP 902*a* to identify the candidate APs and STAs selected for coordination and the optimal coordination scheme (e.g. CBF, co-OFDMA, etc.) based on the level of measured interference.

The RM feedback 910 may include a report indicating the RSSI/PL/SNR/CQI of the received signals detected from the APs listed in the RMRP 908. The Sharing AP 902a may provide information to the Shared APs 902b, 902c, and 902d in the MAP-RMRP 906 in order to maintain orthogonality between the RMRP trigger frames. In one example, the measurement may be a quantized level from a predesigned table of the allowed measurement levels. In another example, the measurement may be an indicator relative to a given threshold to indicate high/low level. The threshold value may be a dynamic setting which may be signaled from the Sharing AP 902a to the Shared APs 902b, 902c, and 902d to cover several scenarios of the designated coordination.

A MAP-RMRP 906 may be a variant of a trigger frame or a new control frame. In one example, the Trigger Type subfield encoding may use one of the reserved values (for example, 9) as indicated in Table 1. However, any other value may be used to indicate the MAP-RMRP trigger frame variant. In one method, MAP-RMRP 906 may be sent by the Sharing AP 902a to the Shared APs 902b, 902c, and 902d to setup for the radio measurement phase 920. This setup may include: indicating the list of the Shared APs participating in the radio measurement phase; allocating orthogonal resources (time/frequency/space/code) to the Shared APs participating in the radio measurement phase 920 to send the RMRP trigger frame.

Signaling of the radio measurements phase 920 parameters may include: a type of measurement (RSS/PL/CQI/SNR); feedback type to indicate that the measurement is either a quantized level (more resolution) or high/low indication. The threshold to indicate whether a given measurement is high or low.

The Sharing AP 902a may send the MAP-RMRP 906 on a channel that is known by all the Shared APs 902b, 902c, and 902d and all APs (Sharing and Shared) may respond after a Short Interframe Space (SIFS) (or any other interframe space) by sending RMRP 908 to their associated STAs. It may not be necessary that all the APs responding to the MAP-RMRP 906 participate in the Multi-AP channel sounding phase 930 which immediately follows the radio measurement phase.

The APs in a coordinating group may send the RMRP trigger frame to all or some of their associated STAs in order to collect the RM feedback. This feedback is analyzed by the Sharing AP to decide which APs and STAs might participate in the subsequent Multi-AP channel sounding. The RMRP may be a variant of the trigger frame indicating the STAs that may participate in the RM phase and providing parameters to the STAs to prepare the RM feedback. The RMRP trigger frames may be sent from different APs on orthogonal radio resources (frequency/time/space/code) indicated by the Sharing AP in the MAP-RMRP.

In one method, the Trigger Type subfield in the Common Info field of the trigger frame may indicate a newly assigned type to the RMRP trigger frame variant. In one example, the Trigger Type subfield encoding may use one of the reserved values (for example, 8) as indicated in Table 1. However, any other value may be used to indicate the RMRP trigger frame variant.

In one method, the measurement type may be signaled using some of the reserved bits in the Common Info field. Accordingly, all the STAs participating in the RM phase may respond with the same measurement type. In another example, the measurement type may be signaled individually for each STA in the User Info field allowing for more flexibility in collecting different types of measurements form different users which in turn may allow for engaging different STAs in different coordination schemes (e.g., CBF, JTX, etc.).

TABLE 1

| Trigger Type Subfield Encoding | |
| --- | --- |
| Trigger Type Subfield Value | Trigger Frame Variant |
| 0 | Basic |
| 1 | Beamforming Report Poll (BFRP) |
| 2 | MU-BAR |
| 3 | MU-RTS |
| 4 | Buffer Status Report Poll (BSRP) |
| 5 | GCR MU-BAR |
| 6 | Bandwidth Query Report Poll (BQRP) |
| 7 | NDP Feedback Report Poll (NFRP) |
| 8 | Radio Measurements Report Poll (RMRP) |
| 9 | Multi-AP Radio Measurements Report Poll (MAP-RMRP) |
| 10-15 | Reserved |

In one method, the Trigger Dependent User Info subfield of the User Info field may be used to signal the RM phase parameters which may be different for different STAs in the same trigger frame. In one example, two or more bits may be used to encode the Measurement Type (RSS, PL, CQI, SNR), one or more bits may be used to indicate feedback type (e.g., quantized level or high/low indication), and two or more bits may be used to signal a threshold in case of high/low indication Feedback Type. This threshold may be used by the STA to decide if the measurement from a certain AP is higher than or equal to the threshold (high) or lower than the threshold (low).

In one method, the Trigger Dependent User Info subfield in the User Info field may be used to signal the list of the APs (Sharing or Shared) in the vicinity of a STA which the measurements of the received signals from them are required. For example, the APs may be identified by the compressed BSSID or an assigned ID to the Sharing/Shared AP in the Multi-AP coordinating group. In another method, the STA may be required to provide measurements for the APs with a measurement higher than a predefined threshold (high interference, proximity, etc.). In this method, the AP sending the RMRP is not required to explicitly list the APs which the intended STA may provide measurements for them. In other words, the STA may send RM feedback which contains a list of the APs whose received signal from them is higher than a given threshold.

In one method, the RM feedback may be sent from the STAs listed in the RMRP trigger frame back to their associated APs. In this case, we assume that each AP may send individual triggers to their associated STAs. The Shared APs may then send the collected measurements to the Sharing AP through a wired or a wireless connection. In another method, the STAs may send the RM feedback directly to the Sharing AP as a response to a single RMRP trigger frame sent from the Sharing AP to all the STAs participating in the RM phase.

The RM feedback is a list of radio measurements measured by the STAs for the received signals from different APs in its vicinity. The STAs may prepare the measurements based on the feedback parameters sent by the APs in the RMRP trigger frame.

In one method, the STA may perform the radio measurements on the beacon frame or any other control or management frame with known transmit power. In this case, the STA may respond to the RMRP trigger frame with the most recent measurements of the received signals from the APs listed in the RMRP.

In one method, the STA may perform the measurements on the RMRP trigger frames sent from the other APs given that all RMRP trigger frames may be sent on orthogonal resources. Accordingly, the STA may send the measurements in the RM feedback TB PPDU.

The Sharing AP may analyze the collected RM feedback to identify the coordination opportunities and the APs/STAs which may be involved in the Multi-AP channel sounding phase taking place immediately after the RM phase. In one example, the RM feedback for the scenario depicted in FIG. 8 which may be sent from the STAs for the measurements of the received signal from different APs is Table 2. These measurements may be analyzed according to the following algorithm described below:

For each AP, find the OBSS STAs reporting high received signal. For example, AP1→STA21, AP2→STA12, AP3→STA41, AP4→STA32).

For each AP, list a tuple which may contain the following (this AP, victim STA, OBSS AP): (AP1, STA21, AP2); (AP2, STA12, AP1); (AP3, STA41, AP4); and (AP4, STA32, AP3).

Combine all the tuples which contains the same APs in a larger tuple, each tuple may identify a coordination opportunity. For example, (AP1, STA21, AP2)+(AP2, STA12, AP1)→(AP1, AP2, STA12, STA21) and (AP3, STA41, AP4)+(AP4, STA32, AP3)→(AP3, AP4, STA32, STA41).

TABLE 2

Radio Measurement Feedback Example

|  | AP1 | AP2 | AP3 | AP4 |
| --- | --- | --- | --- | --- |
| STA11 | NA | Low | Low | Low |
| STA12 | NA | High | Low | Low |
| STA21 | High | NA | Low | Low |
| STA22 | Low | NA | Low | Low |
| STA31 | Low | Low | NA | Low |
| STA32 | Low | Low | NA | High |
| STA41 | Low | Low | High | NA |
| STA42 | Low | Low | Low | NA |

In an embodiment, an NDPA may signal OBSS STAs. In one method, B20 of the STA Info field, as depicted in FIG. 4, may be renamed to (in-BSS/OBSS) subfield and used to indicate that this STA Info is intended to a STA that is associated to another AP in the coordinating group. The setting of this bit may be: B20=0 to indicate in-BSS STA, B20=1 to indicate OBSS STA. B20 is used as an example to carry the in-BSS/OBSS bit, however, a bit in other locations may be used. In another method, a Special Info field may be introduced in the EHT NDP Announcement frame to signal STAs from the OBSS. In this method a new variant of the NDPA may be defined (EHT NDPA variant).

Figure 10:
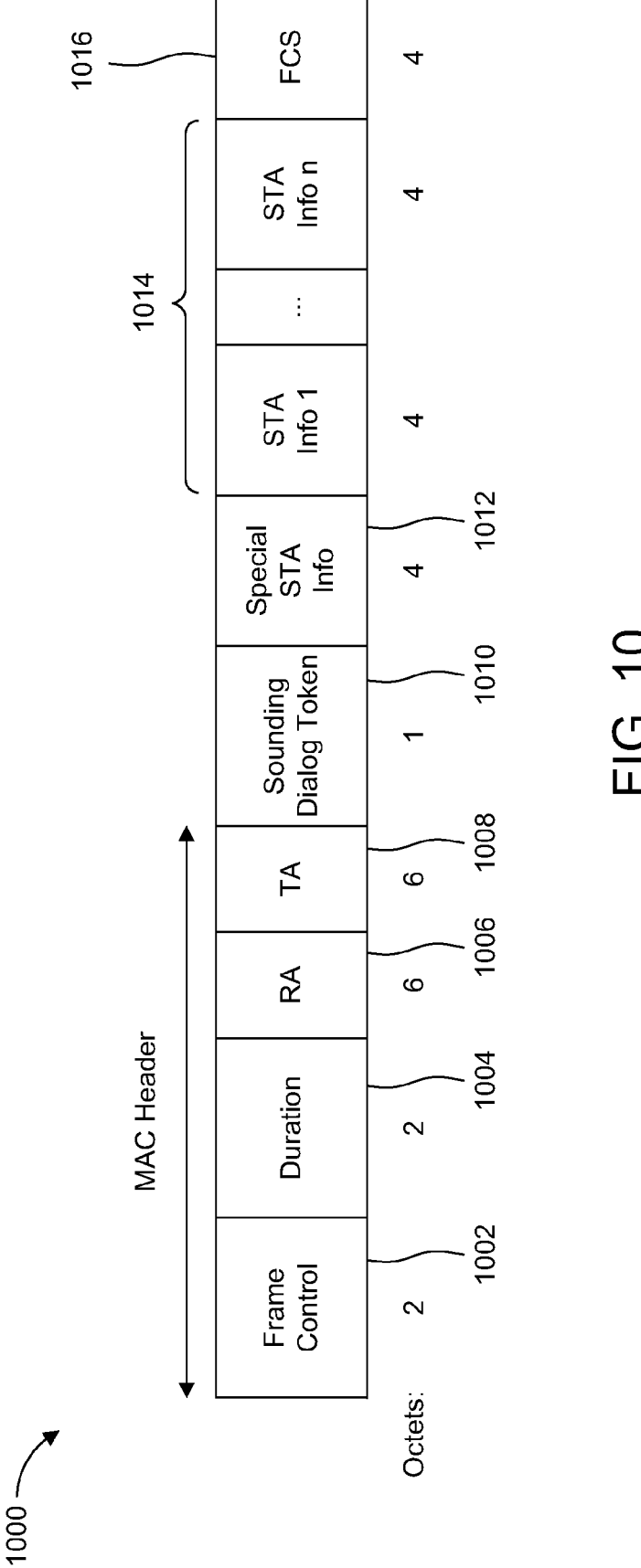
FIG. 10 is a diagram illustrating a first EHT NDPA Variant design with one Special STA Info field.

FIG. 10 is a diagram illustrating an example of a EHT NDPA Variant frame 1000 design with one Special STA Info field 1012. The first EHT NDPA Variant design 1000 may include a Frame Control field 1002, Duration field 1004, RA field 1006, TA field 1010, Special STA Info field 1012, one or more STA Info fields 1014 and FCS field 1016. The Frame Control field 1002 may be 2 octets. The Duration field 1004 may be 2 octets, the RA field 1006 may be 6 octets. The TA field 1008 may be 6 octets. The Sound Token Dialog field 1010 may be 1 octet. The Special STA info field 1012 may be 4 octets. The one or more STA Info field 1014 may be 4 octets. The FCS field 1016 may be 4 octets.

Several designs may be considered in locating the Special STA Info field 1012 in the NDPA. In the first design, only one Special STA Info field 1012 may be inserted just after the Sounding Dialog Token field 1010 as shown in FIG. 10. In this design, a special AID may be used to indicate that this field is a Special STA Info field 1012. In one method, the Special STA Info field 1012 may be optionally present. If the Special STA Info field 1012 is not present, the receiving STAs may think the NDPA frame is for traditional sounding within a BSS but not involving Multi-AP sounding. Alternatively, or additionally, the first STA Info field may be always decoded as a Special STA Info field 1012. The Special STA Info 1012 in this design may include a map to indicate which STA Info fields are intended for the in-BSS STAs and which STA Info fields are for the OBSS STAs.

Figure 11:
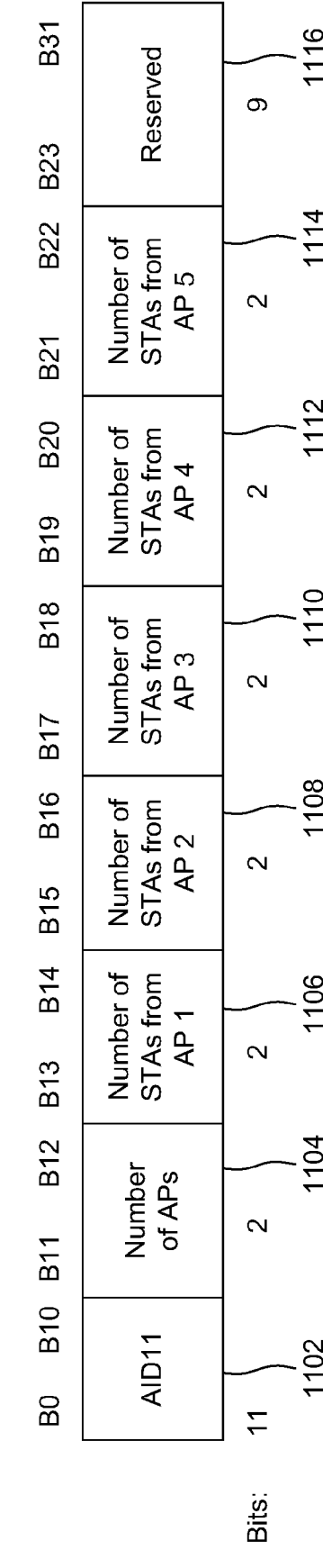
FIG. 11 is a diagram illustrating an example of the Special STA Info field in the first NDPA design.

FIG. 11 is a diagram illustrating an example of the Special STA Info field 1100 in the first NDPA design. The Special STA Info field 1100 may include a AID11 subfield 1102, Number of APs subfield 1104, Number of STAs from AP1 subfield 1106, Number of STAs from AP2 subfield 1108, Number of STAs from AP3 subfield 1110, Number of STAs from AP4 subfield 1112, Number of STAs from AP5 subfield 1114, and reserved subfield 1116. The AID11 subfield may be 11 bits. The Number of APs subfield may be 2 bits. The Number of STAs from AP1 subfield 1106 may be 2 bits. The Number of STAs from AP2 subfield 1108 may be 2 bits. The Number of STAs from AP3 subfield 1110 may be 2 bits. The Number of STAs from AP4 subfield 1112 may be 2 bits. The Number of STAs from AP5 subfield 1114 may be 2 bits. The Reserved subfield 1116 may be 9 bits.

The AID11 subfield 1102 may take a special value to indicate a Special STA Info The number of APs subfield 1104 may indicate the total number of APs involved in the Multi-AP channel sounding (n). The number of STAs from AP m subfields 1106 to 1114 where m∈{1, 2, . . . , n} may indicate the number of STAs involved in the Multi-AP channel sounding from each AP.

The minimum number of APs involved in Multi-AP channel sounding may be two and thus the Number of APs subfield would be used to indicate two or more APs. The Number of STAs from AP m subfield may indicate the absolute number of the STAs involved in the Multi-AP channel sounding from each AP or the relative number of STAs either relative to a given average or relative to the number of STAs from AP1. The order of the APs, in form 1: n, may be a given order signaled by the Sharing AP such that all STAs may identify which AP is mapped to which subfield. Also, this order may be chosen relative to the AP sending this NDPA such that the first AP is always the sender of the NDPA.

Figure 12:
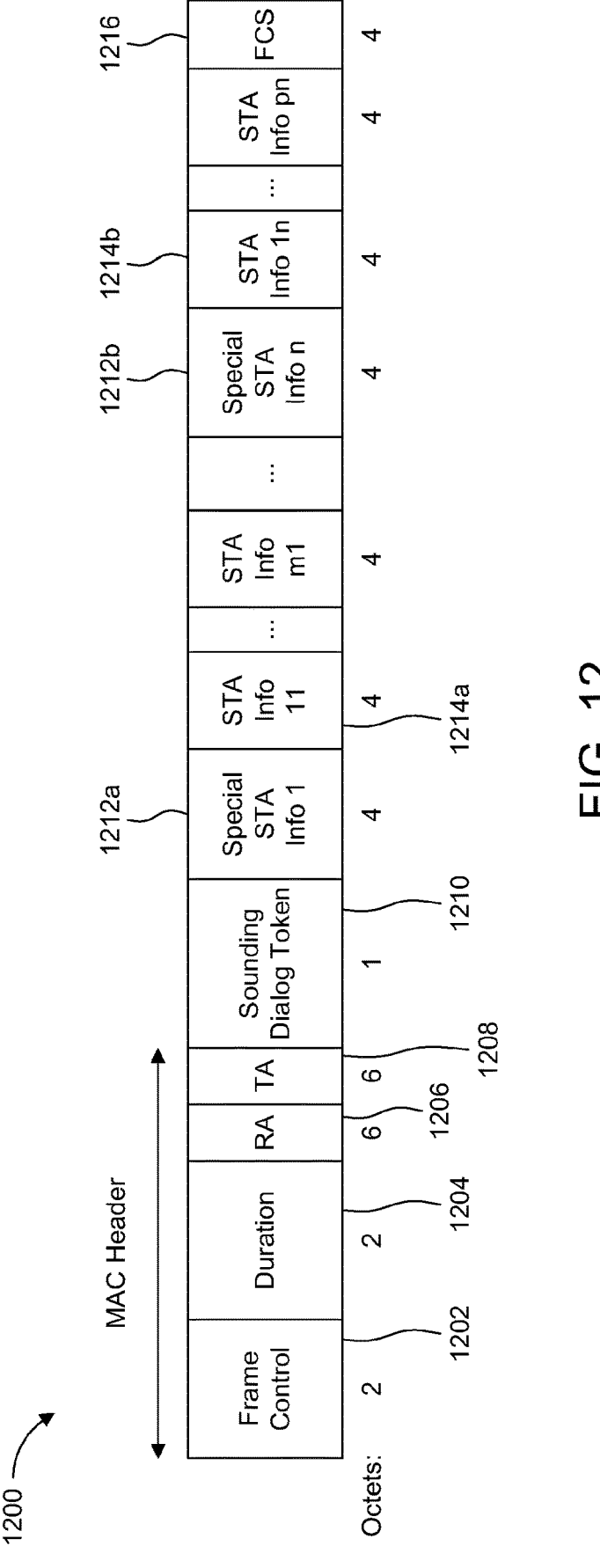
FIG. 12 is a diagram illustrating a second EHT NDPA Variant design with two or more Special STA Info fields.

FIG. 12 is a diagram illustrating another example of a EHT NDPA Variant frame 1200 design with two or more Special STA Info fields. Similar to the EHT NDLA Variant frame 1000, the EHT NDPA Variant frame 1200 may include a Frame Control field 1202, Duration field 1204, RA field 1206, TA field 1208, Sound Dialog Token field 1210, FCS field 1216. The EHT NDPA Variant frame 1200 may include a first Special STA Info field 1212a followed by a STA Info field 1214a. Further, the EHT NDPA Variant frame 1200 may include one or more additional Special STA Info fields 1212b, each of which is followed by one or more STA Info fields 1214b. The Frame Control field 1202 may be 2 octets. The Duration field 1204 may be 2 octets. The RA field 1206 may be 6 octets. The RA field 1208 may be 6 octets. The Sounding Dialog Token field may be 1 octet. The Special STA Info fields (i.e., 1212a and 1212b) may be 4 octets. The STA Info Fields (i.e., 1214a and 1214b) may be 4 octets. The FCS field 1216 may be 4 octets.

As shown in FIG. 12, the EHT NDPA Variant frame 1200 design may include two or more Special STA Info (i.e., 1212a and 1212b) may be added to the NDPA where each Special STA Info uses a special AID to indicate one of the APs involved in the current sounding procedure. The STA Info fields (i.e., 1216a and 1216b) following Special STA Info fields 1212a and 1212b are intended to the STAs associated with this AP. In one method, the AP which transmits the NDPA frame may not need to include a Special STA Info field to identify itself.

Figure 13:
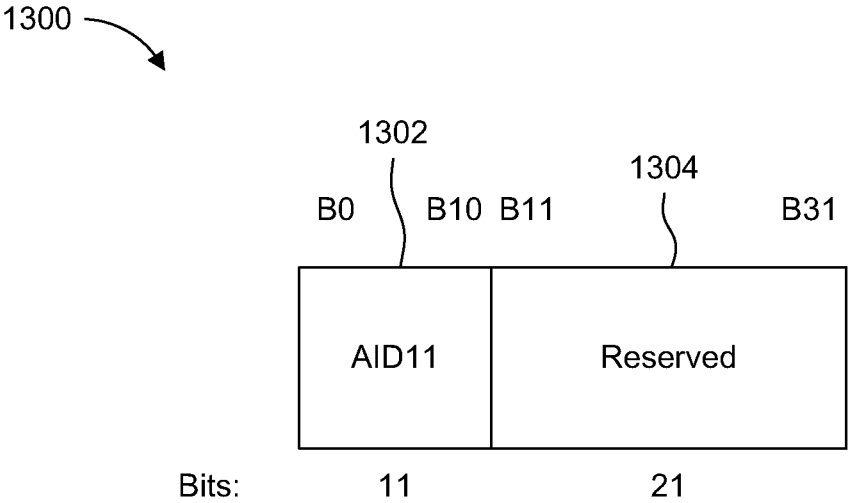
FIG. 13 is a diagram illustrating an example of the Special STA Info field in the second NDPA design.

FIG. 13 is a diagram illustrating an example of the Special STA Info field for EHT NDPA Variant frame 1200. The Special STA Info field 1300 may include am AID11 subfield 1302 and Reserved subfield 1304. The AID11 1302 subfield may be 11 bits while the Reserved subfield 1304 may be 21 bits. In one example, the Special STA Info field 1300 may include AID11 subfield 1302 and all the remaining bits may be reserved as depicted in FIG. 13. In one method, some AID values are reserved for shared APs in MAP transmissions. For example, AID values from 0 to 7 may be reserved for the identification of the APs involved in the Multi-AP channel sounding. This special AID11 may then be used in the Special STA Info field to identify a given AP such that the following STA Info subfields are intended to STAs associated to this AP. In one method, a predefined AID value may be used to indicate the STA Info field may be a Special STA Info field. A BSSID, or a compressed BSSID, or other type of AP ID may follow the AID11 field to indicate the shared AP.

Figure 14:
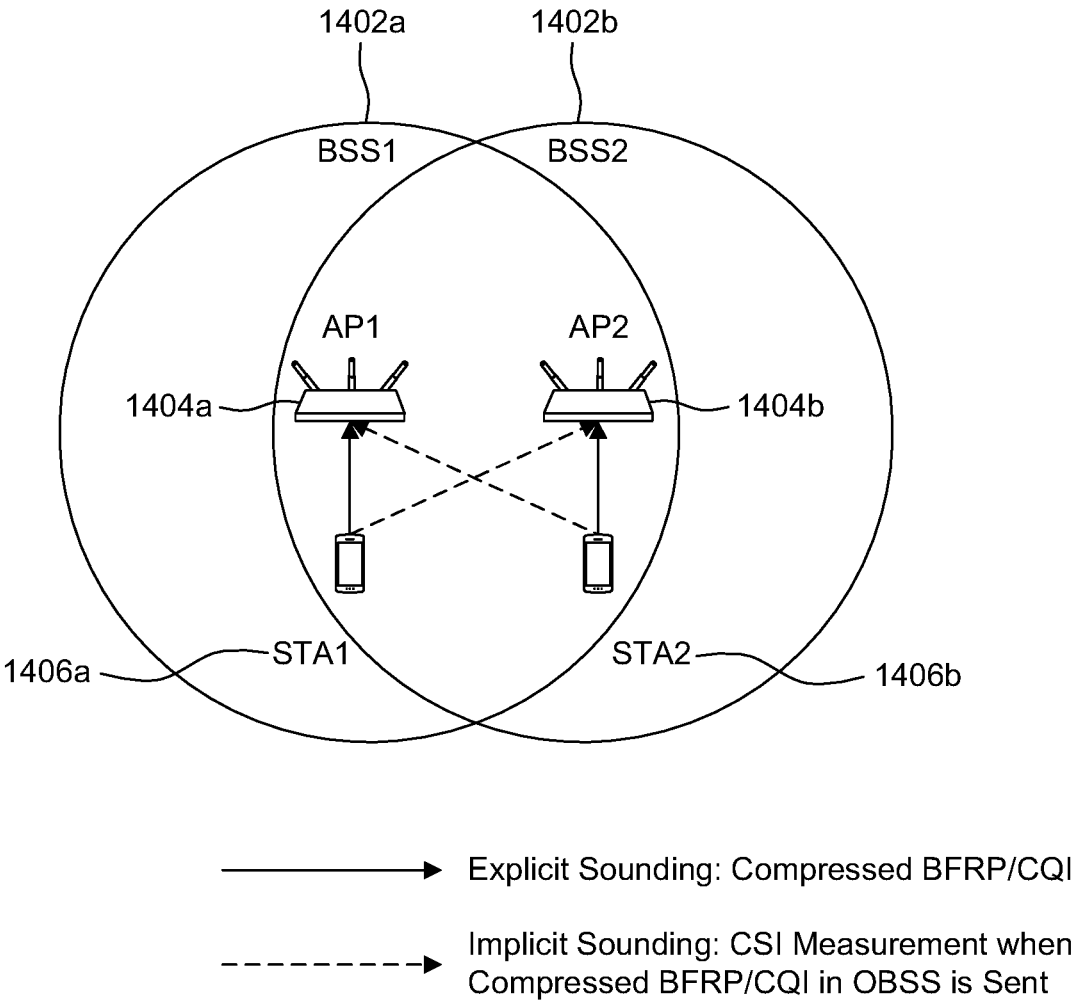
FIG. 14 is a diagram illustrating an example of multi-AP hybrid sounding.

FIG. 14 is a diagram illustrating an example of multi-AP hybrid sounding. Multi-AP Channel Sounding may include hybrid sounding. In one embodiment, the hybrid channel sounding in Coordinate Multi-AP setup may be achieved by using the explicit sounding procedure within each BSS (i.e., BSS1 1402a and BSS2 1402b). The CSI information between each AP (i.e., AP1 1404a and AP2 1404b) and the STAs (i.e., STA1 1406a and STA2 1406b) in other BSSs may be obtained implicitly, assuming channel reciprocity, when the associated STAs of that AP sending their TB PPDUs which contains LTFs.

FIG. 14 shows an example of such a hybrid channel sounding. In this example, AP1 1404a and AP2 1404b independently, in an orthogonal manner, collect sounding feedback (e.g., Compressed BFRP/CQI information from their associated STAs 1406a and 1406b). At the same time, each AP may also estimate the channel between this AP and the STAs in neighbor BSS when the STAs send their sounding feedback. Such a channel estimation may be obtained when the STAs in the neighbor BSS send any PPDU in UL as long as there is LTFs or any known or predefined sequences in the preamble.

Figure 15:
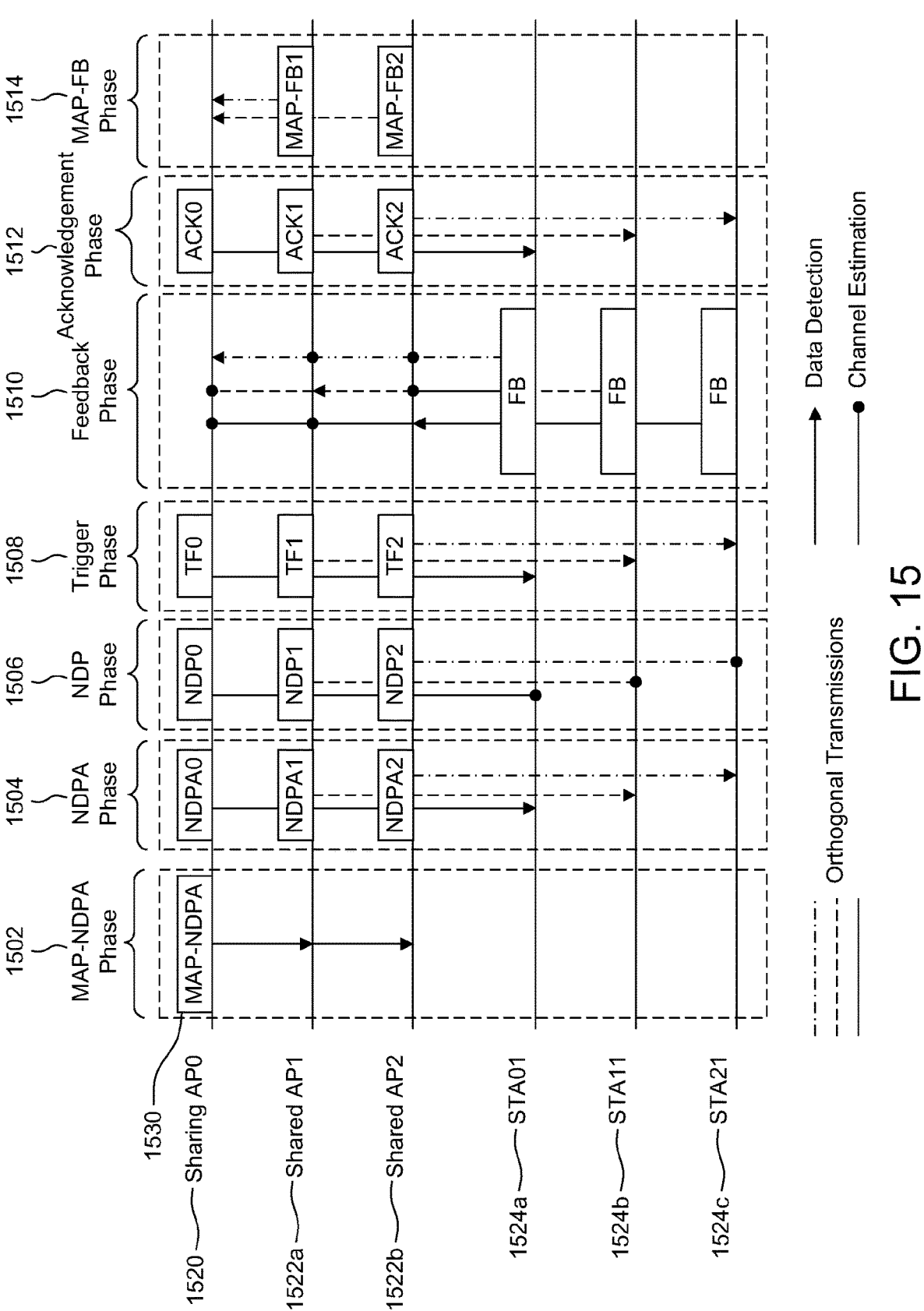
FIG. 15 is a diagram illustrating a parallel hybrid sounding process.
Figure 16:
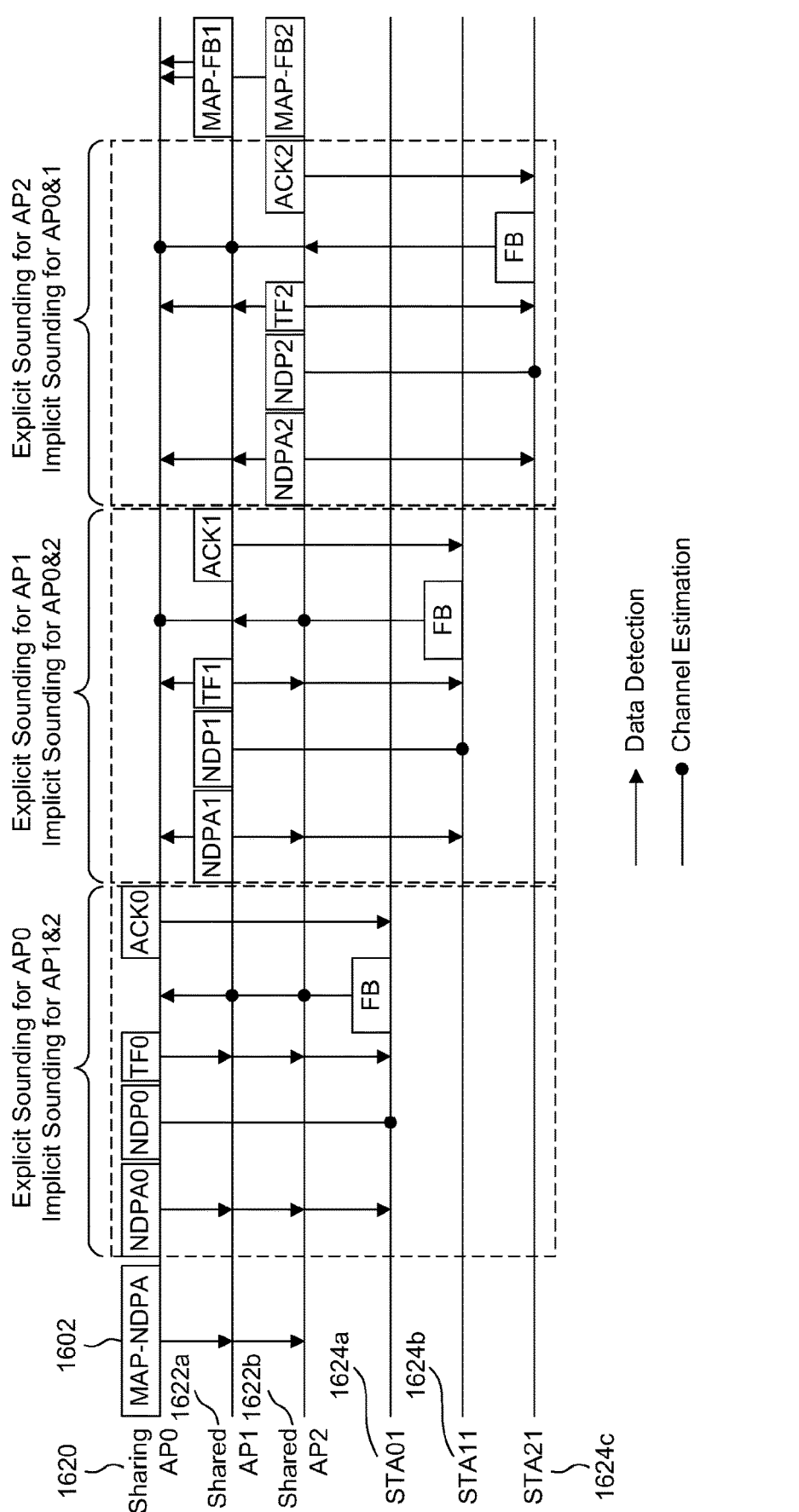
FIG. 16 is a diagram illustrating a sequential hybrid sounding process.

The hybrid channel sounding in Coordinate Multi-AP may be achieved by two schemes: Parallel Hybrid Sounding and Sequential Hybrid Sounding. FIG. 15 is a diagram illustrating a parallel hybrid sounding process and FIG. 16 is a diagram illustrating a sequential hybrid sounding process. In FIGS. 15 and 16, STAi1 is associated with APi for i=0, 1, 2, in BSSi (not shown in these FIGs.). There may be more STAs in each BSS participating in the sounding process although there is only one STA communicates with its associated AP in these FIGs.

FIG. 15 is a diagram illustrating a parallel hybrid sounding process s. As shown in FIG. 15, in a parallel hybrid sounding process, each step of the per-BSS sounding process (i.e., NDPA Phase 1504 to NDP Phase 1506 to Trigger Phase 1508 to Feedback Phase 1510 to Acknowledgement Phase 1512) may need to be completed for all BSSs before the next step starts. For example, as shown in FIG. 15, the transmission of NDPA from all APs (i.e., 1520, 1522a, and 1522b) may need to be completed before the transmission of NDP from all APs start. One may also name each step of the parallel hybrid sounding process in Multi-AP as a "phase.".

Each phase of the operation after the MAP-MDPA phase may not be started until the previous phase is completed. The time gap between two phases may need to be small enough (e.g., SIFS, to avoid losing the media).

In each phase of the parallel hybrid sounding process, the signals transmitted from STAs 1524a, 1524b, and 1524c (AP or non-AP, in DL or UL) may be transmitted orthogonally (represented using different dashed lines in FIG. 15) in a domain, which may be frequency, time, code or space, or any combination or subset of these domains. It may also possible that different transmission phases in the parallel hybrid sounding process use different orthogonal transmission schemes. For example, during the NDPA phase 1504, transmissions from different APs take place on different subchannels, while during the NDP phase 1504, the transmissions of NDPs from different APs are achieve in different time with certain order and using orthogonal codes (e.g., coded with an orthogonal (P) matrix) over the full channel.

During the Feedback Phase 1510 all APs participating in the parallel hybrid sounding process may need to listen (receive) to the feedback signals from all STAs in its own BSS or OBSSs to measure the channel based on the LTFs in the preambles of those transmissions. This is how the implicit sounding between AP and STAs in OBSS may be achieved.

To enable the parallel hybrid sounding process, the Sharing AP 1520 may control or manage the whole sounding procedure by sending a MAP-NDPA frame 1530, transmitted on predefined channel (known by all shared AP during the coordinated MAP set up procedure), to all Shared APs 1522a and 1522b with information as follows: a type of sounding process (e.g., parallel or sequential); the Shared AP IDs that may participate in the Parallel Hybrid Sounding Process; a resource allocation or usage for each BSS in each or some of the Parallel Hybrid Sounding Process phases may be communicated.

The resources may include frequency domain resources including channels or subchannels, subblocks or RU or MRUs that each BSS may use during a phase in its sounding process. This may be the case during the NDPA phase and feedback phase. The resources may also include time domain resources, for example, an order for the transmissions, including NDPAs, NDPs, feedbacks and ACKs, from all, or group of, APs and/or the STAs in all BSSs.

The frequency domain and time domain resources may be used jointly. For example, if some NDPAs transmitted from different APs need to use the same primary channel, they may need to be transmitted sequentially in time; otherwise, they may be transmitted at the same time but on different channels.

Resources may further include code domain resources including orthogonal codes, the indices of the orthogonal codes, that may assign to the transmissions, including NDPAs, NDPs, Feedbacks and ACKs, from all, or group of, APs and/or the STAs in all BSSs. The code domain and time domain resources may be used jointly. For example, the NDP transmission typically needs to be transmitted over the whole BSS bandwidth. To achieve the orthogonal transmission from different APs, one may use a set of orthogonal codes (e.g., P matrix), or use different time slots, to separate them. Beamforming information or precoding information for all APs and STAs during their transmissions using multiple antennas.

The Sharing AP 1520 may send a MAP-NDPA frame 1530 with information further including a transmit power upper bounds, or other spatial reuse parameters, for all SPs and STAs which may use the same resources during their transmissions. Other parameters, such as CP length, number of LTF symbols in UL and DL transmissions for all APs and STAs, OFDM numerologies may be included as well as a resource allocation (in frequency, time, code, or space) for shared APs to feedback their received and/or measured channel information during the MAP-FB phase. A feedback type, which include CQI, (compressed) CSI, codebook, etc. may also be included.

After all coordinated APs receive the channel information feedback from the STAs in the same BSS and measured the channels from the STAs in OBSSs, all shared APs may send that information to the shared AP during the MAP-FB phase as shown in FIG. 15. The MAP-FB frame may include: the CSI and/or CQI sent from the STAs in the same BSS; the CSI and/or CQI of the channels from the OBSS STAs measured during the feedback phase; the STA IDs corresponding to the STAs mentioned above; the subchannel puncturing information, e.g., puncturing bitmap pattern or code, for each BSS used during NDP transmission; the subchannel puncturing information, e.g., puncturing bitmap pattern or code, for each BSS used during the channel measurement from the FB transmission (implicit sounding).

In a sequential hybrid sounding process, the sounding procedure (i.e., NPDA→NDP→TF→FB→ACK) in each BSS takes place independently from the ones in other BSSs in time. However, when an AP sends NDPA frame, other APs may need to decode the frame so that they may know when and/or where (in frequency) they may measure the channel information from which STAs in advance when the feedback is sent by STAs associated to that AP to achieve implicit sounding. For example, as shown in FIG. 16, when AP0 sends NDPA0, AP1 and AP2 may decode the NDPA0 frame so that, when STA01 sends the feedback, AP1 and AP2 may measure the channel in UL for that STA at given time and channel. The time for measuring the UL channel from the STAs may also be achieved by listening the TF0.

To enable the sequential hybrid sounding process, the Sharing AP 1620 may control or manage the whole sounding procedure by sending a MAP-NDPA frame 1602, transmitted on predefined channel (known by all shared AP during the coordinated MAP set up procedure), to all Shared APs 1622a and 1622b with the following possible information: the type of sounding process (e.g., parallel or sequential); the Shared AP IDs that may participated in the parallel hybrid sounding process; the order of the per-BSS sounding procedure among different BSSs; the frequency resources that may be used for some of the steps in sounding procedure for each BSS, e.g., NDPA and Feedback (FB); and feedback type (e.g., CQI, CSI, precoding codebook, etc.).

The procedure for MAP-FBs shown in FIG. 16 may be the same as the one in parallel hybrid sounding process. The parallel hybrid sounding process and sequential sounding process may be combined together, controlled or managed by a single MAP-NDPA frame. This may be used when there are limited resources and multiple TXOPs are needed.

Figure 17:
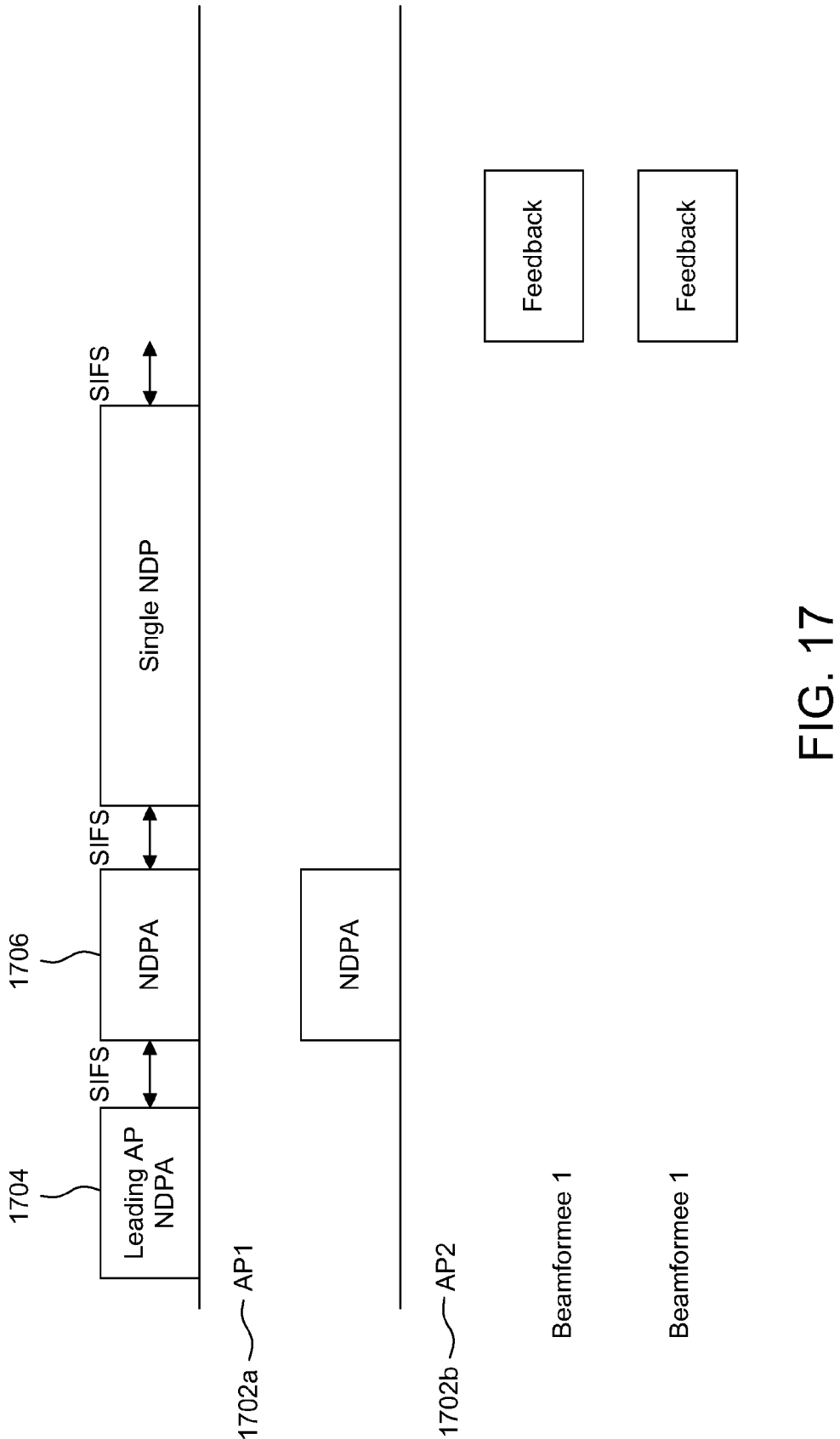
FIG. 17 is a diagram illustrating a single NDP for MAP sounding in which AP1 is a leading AP.

FIG. 17 is a diagram illustrating a single NDP 1706 for MAP sounding in which AP1 1702 is a leading AP. Multi-AP sounding may require coordinating APs to send the NDPs to their associated and non-associated STAs. This may have a cost of additional overhead, especially when the number of cooperating APs and the number of participating STAs are increased. To save the overhead and reduce the complexity, Single NDP sounding protocol is proposed in FIG. 17. In this protocol, a single NDP sent from the leading AP 1702a during the AP coordinating period. This leading AP 1702a is not necessarily the master AP in the overall MAP set. It may be a dynamic role (i.e., the leading AP 1702a may be changed from one cooperation to another cooperation). In FIG. 17, AP1 1702a, is the leading AP during this MAP cooperation, and AP2 1702b is the cooperating AP. They send the NDPA 1706 via a certain multiplexing mechanism (e.g., in frequency domain, time domain, code domain, etc.) to the STAs.

In the Single NDP sounding protocol embodiment, the leading AP 1702a sends out a Leading AP NDPA 1704, which notifies all cooperating APs of the start of the Single NDP sounding protocol and synchronizes the transmission of NDPAs from coordinating APs to associated STAs. After this phase, each AP sends out one NDPA to announce the CSI collection. The channel feedback may not only include the channel between the AP and its associate STAs but also the channel between the AP and the non-associated STAs. After NDPA is sent out (e.g., a SIF time slot), a single NDP is sent to all STAs whose addresses are included to all NDPAs.

Figure 18:
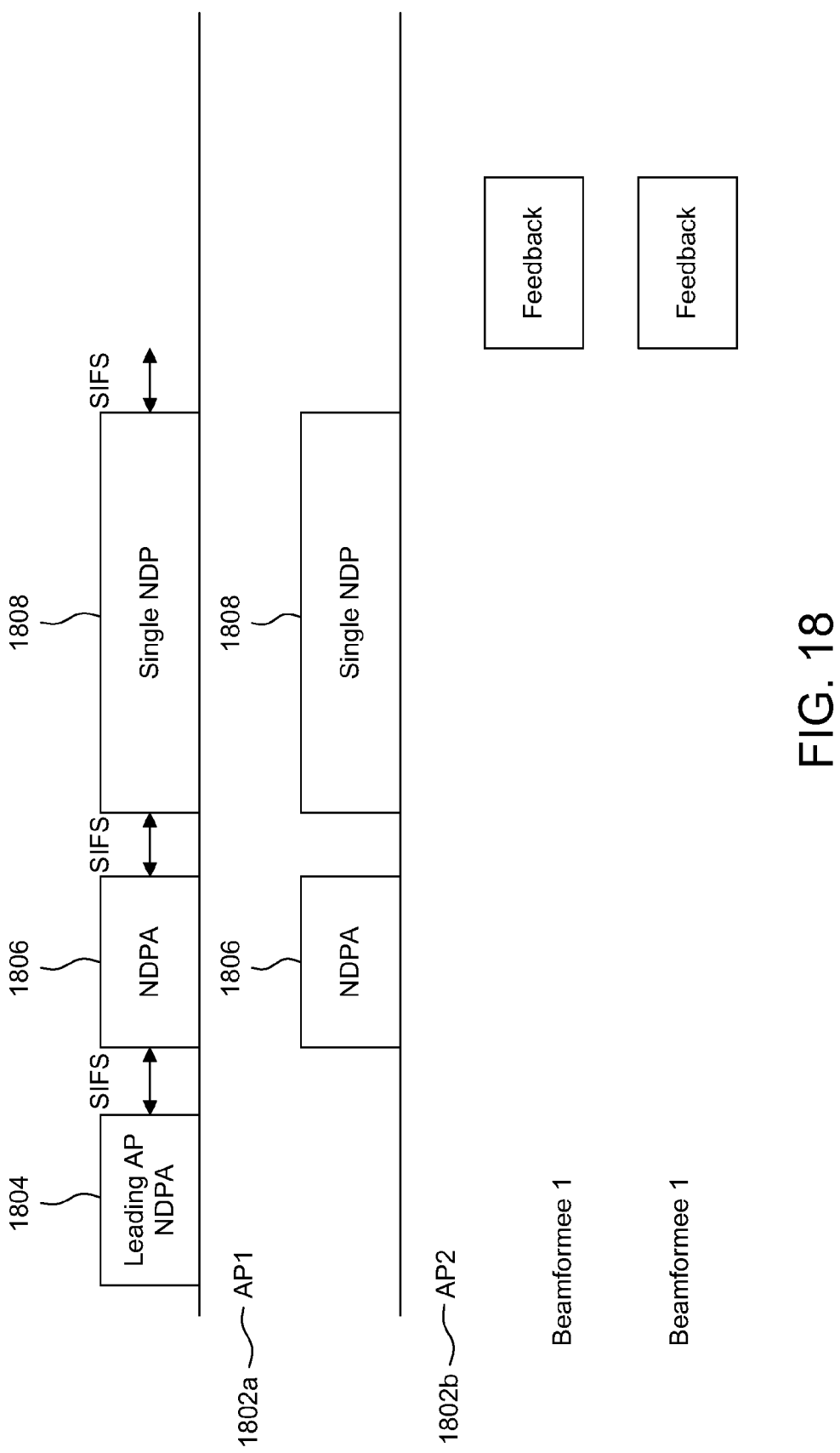
FIG. 18 is a diagram illustrating a duplicated NDP for MAP Sounding in which AP1 is the leading AP and a single NDP is duplicated over coordinating APs.

FIG. 18 is a diagram illustrating a duplicated NDP for MAP Sounding in which AP1 1802a is the leading AP and a single NDP 1806 is duplicated over coordinating APs. New information may be included in the Leading AP NDPA 1804 or Master NDPA including: an indication of MAP NDP sounding protocol (e.g., 1 represents Non-MAP NDP sounding protocol and 0 represents MAP NDP sounding protocol); the type of MAP NDP sounding protocol (i.e., Single NDP sounding protocol (FIG. 17), Duplicated Singe NDP sounding protocol (FIG. 18), parallel sounding protocol (FIG. 15), or sequential sounding protocol (FIG. 16)); or coordinating APs that participating in this MAP sounding protocol.

One way to implement NDPA from cooperating APs is to have these APs transmit the same NDPA frame 1806. New information may be included in the NDPA frame 1806: an indication of MAP NDP sounding protocol, e.g., 1 represents Non_MAP NDP sounding protocol and 0 represents MAP NDP sounding protocol. This may use B20 of STA Info field of EHT NDP Announcement frame; type of MAP sounding protocol, i.e., Single NDP sounding protocol (i.e., FIG. 17), Duplicated Singe NDP sounding protocol (i.e., FIG. 18), or parallel sounding protocol (i.e., FIG. 15), or sequential sounding protocol (i.e., FIG. 16); an indication of requesting CSI from non-associated STAs, i.e., additional BSS color may need to be included to notify the STA that are not associated with the AP. This may also be used with modified AID11 of B0-B10 of STA Info field in EHT NDP Announcement frame; NDP source allocation, e.g., what resource is allocated for each participating AP to transmit the NDP or the partial part of NDP (e.g., EHT-LTF). This may use B28-B31 of STA Info field forma in an EHT NDP Announcement frame.

Figure 19:
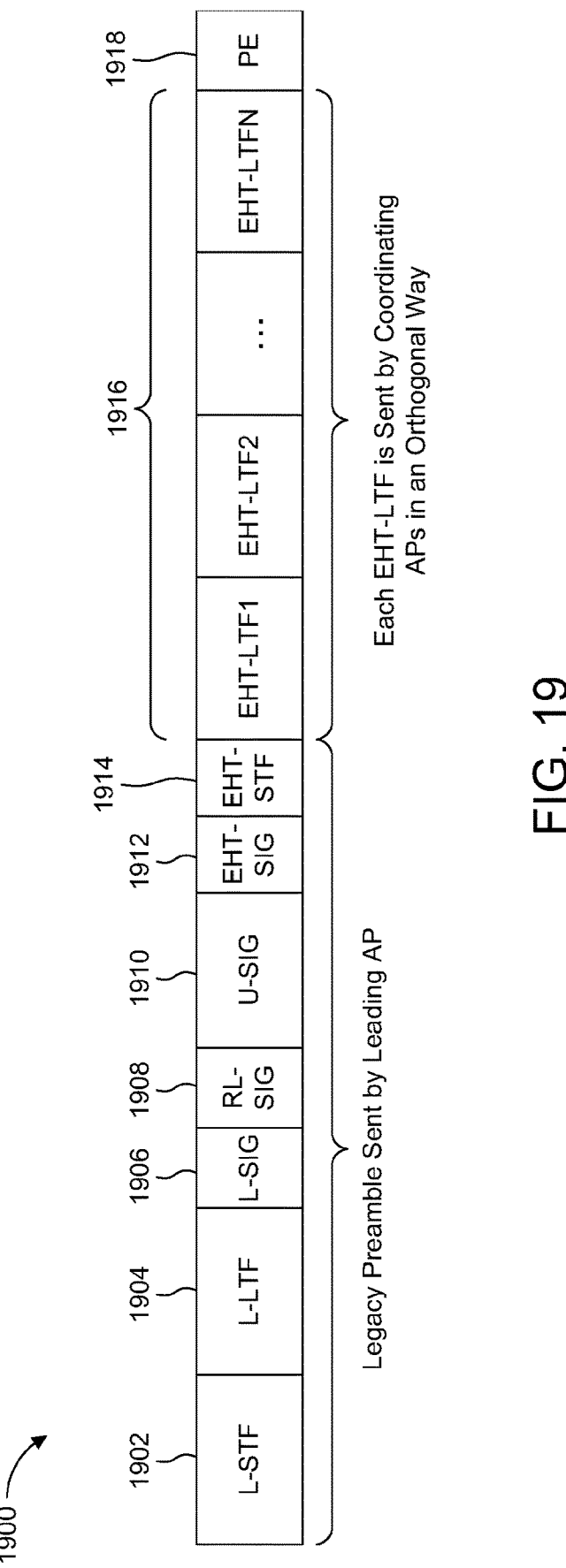
FIG. 19 is a diagram illustrating a physical layer protocol data unit (PPDU) format used in a single NDP for MAP sounding.

FIG. 19 is a diagram illustrating a physical layer protocol data unit (PPDU) format used in a single NDP for MAP sounding. The physical layer protocol data unit (PPDU) format 1900 may include a L-STF frame 1902, L-LTF frame 1904, L-SIG 1906, RL-SIG 1908, U-SIG 1910, EHT-SIG 1912, EHT-STF 1914, one or more EHT-LTFs 1916, and PE 1918.

When one NDP is sent by multiple APs jointly, new information may be included in U-SIG field or any other part of the PPDU used to transmit NDP including: an indication that shows this NDP is for STAs that may support MAP sounding; BSS color information; number of APs included in this NDP; EHT-LTF transmission pattern and resource; and an orthogonality mechanism.

BSS Color information may be set to 0 if there is at least one intended recipient STA that is not a member of the AP's BSS; alternatively, a new format of BSS Color, which has N1+N2=6 bits. N1 bits represent the BSS Color that the leading AP belongs to, N2 bits represent there is existing at least one more AP that has different BSS Color in the MAP sounding.

An EHT-LTF transmission pattern and resource, e.g., the orders of EHT-LTF sent by APs may be orthogonal mechanism dependent. If it is frequency domain orthogonal, then it should indicate which tone or subcarrier is used by which AP; if it is code domain orthogonal, then it should indicate which orthogonal sequence is applied to which AP.

An orthogonality mechanism may be used to differentiate the same EHT-LTF symbol from different APs, e.g., tone-interleaved EHT-LTF transmission, orthogonal or pseudo-orthogonal code based EHT-LTF transmission, or hybrid, etc.

A number of EHT-LTFs in Single NDP may be equal to $\max(N_{tx1}, N_{tx2}, \ldots, N_{txM})$, where $N_{txi}$ is the number of transmitter antennas from $AP_i$ that request CSI information from STAs. $N_{txi}$ may be the whole set or a subset of transmitter antennas from $AP_i$. The total number of cooperating APs is $N_{AP}$. Here is the example of the EHT-LTF transmission from two APs:

In an example, assume there are two cooperating APs, i.e., $N_{AP}=2$ and each AP has two transmitter antennas, i.e., $N_{tx1}=N_{tx2}=2$. The channel elements corresponding to transmitter antennas from APi are $h_{i1}$, $h_{i2}$. AP1 and AP2 transmit the same EHT-LTF symbol. Assuming that there are $N_{rx}$ receiver antennas in each recipient, when the orthogonal code matrix is applied to the EHT-LTF symbol, the received signal matrix Y at one STA may be given as follows:

$$Y = \sum_{i=1}^{N_{AP}} g(H_i S_{EHT-LTF}) \qquad \text{Equation 1}$$

Where $H_i$ is the channel element matrix from $AP_i$ to the receiver antennas.

$$h_{n_{rx},n_{tx}}^{(i)}$$

may be defined as the channel element from the $n_{tx}$-th transmitter antenna of $AP_i$ to the $n_{rx}$-th receiver antenna of the recipient STA. Then $H_{n_{rx}}$ has dimension, $N_{rx} \times N_{AP}$ and may be given as follows:

$$H_i = \begin{bmatrix} h_{11}^{(i)} & h_{12}^{(i)} \\ h_{21}^{(i)} & h_{22}^{(i)} \end{bmatrix} \qquad \text{Equation 2}$$

Function g( ) is the orthogonal function to make the symbols from different APs orthogonal, e.g., it may be a spreading function via multiplying each element of the matrix with an orthogonal sequence. The orthogonal code may be obtained from the row of the orthogonal matrix P. The exemplary P when $N_{AP}=2$ may be given as follows:

$$P = \begin{bmatrix} 1 & 1 \\ -1 & 1 \end{bmatrix} \qquad \text{Equation 3}$$

$S_{EHT-LTF}$ is EHT-LTF symbol matrix with dimension $N_{EHT-LTF} \times N_{EHT-LTF}$, e.g.

$$S_{EHT-LTF} = \begin{bmatrix} s_1 & 0 \\ 0 & s_2 \end{bmatrix}, \text{ where } s_1 = s_2 \text{ or } s_2 = f(s_1). \qquad \text{Equation 4}$$

Figure 20:
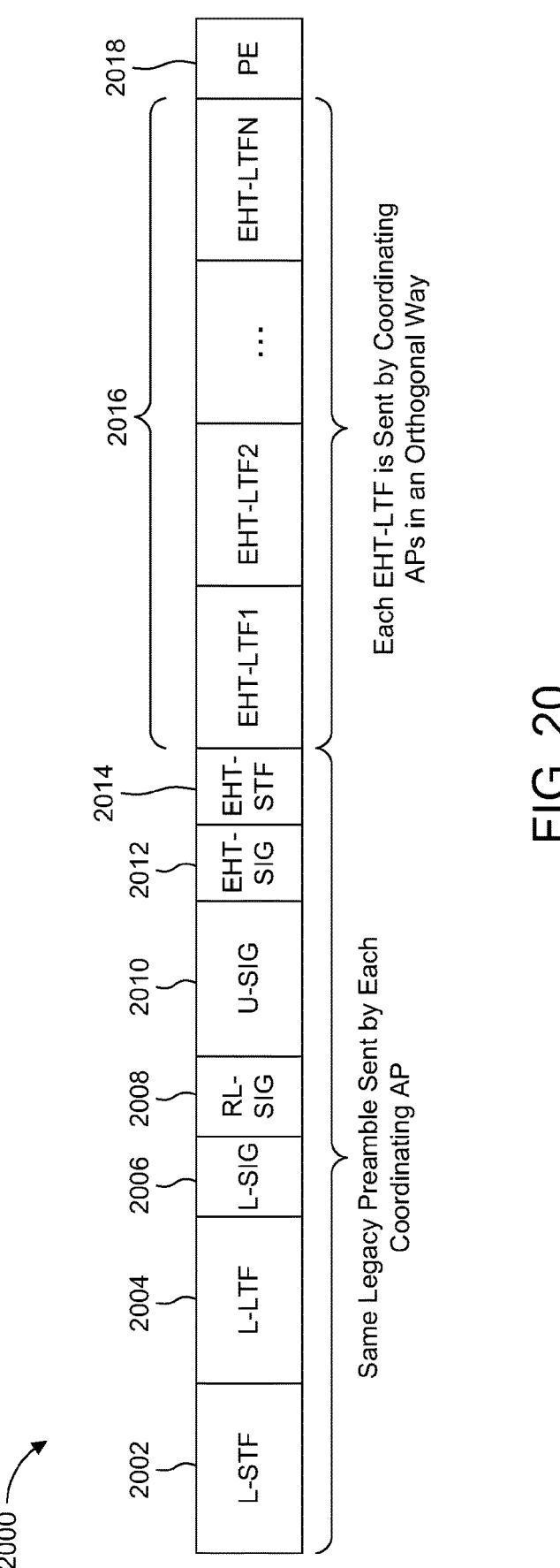
FIG. 20 is a diagram illustrating a PPDU format used in duplicated NDP for MAP sounding.

FIG. 20 is a diagram illustrating a PPDU 2000 format used in duplicated NDP for MAP sounding. The PPDU format 2000 may include a L-STF frame 2002, L-LTF frame 2004, L-SIG 2006, RL-SIG 2008, U-SIG 2010, EHT-SIG 2012, EHT-STF 2014, one or more EHT-LTFs 2016, and PE 2018.

Figure 21:
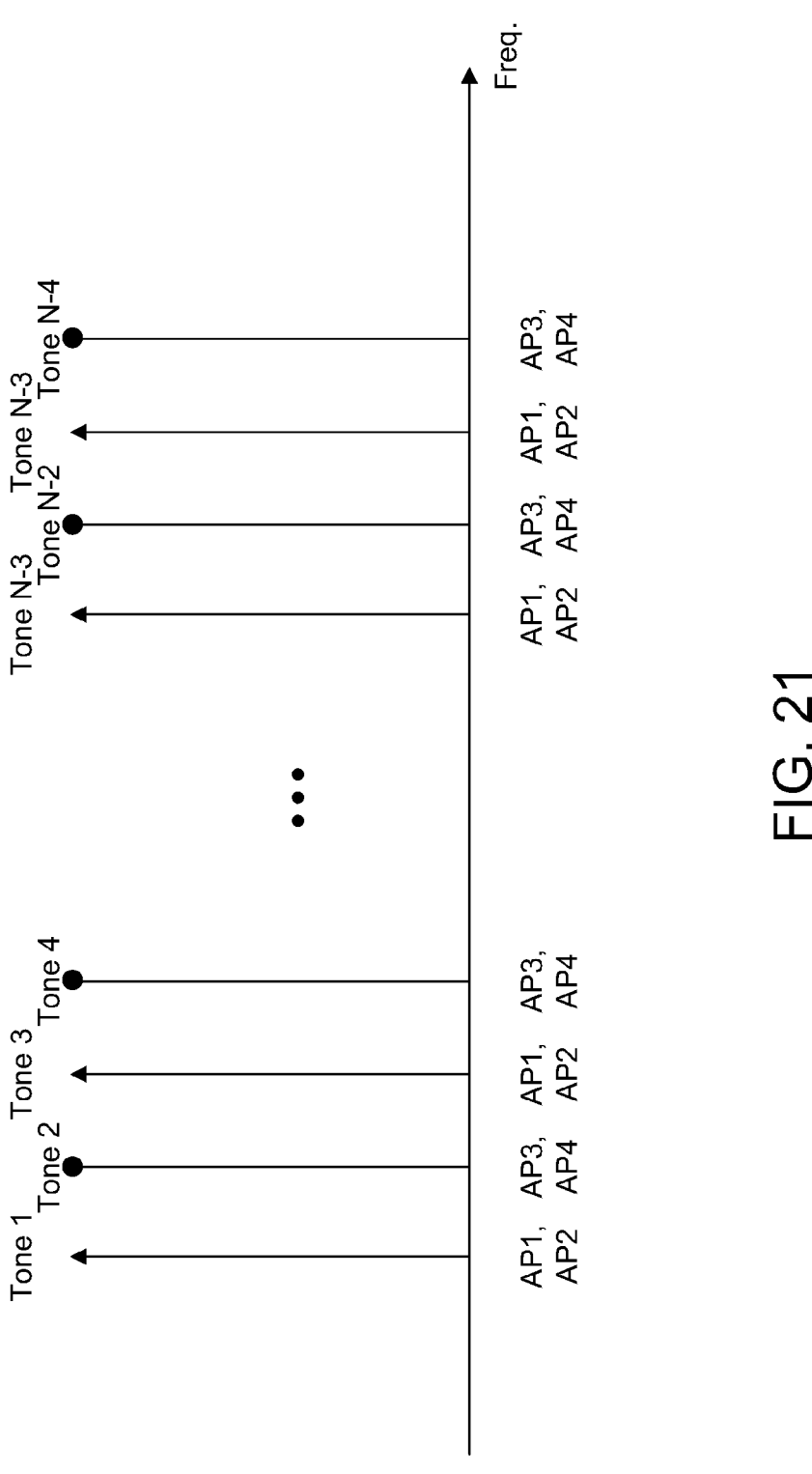
FIG. 21 is a diagram illustrating a hybrid tone-interleaved and orthogonal code based EHT-LTF symbol transmission.

FIG. 21 is a diagram illustrating a hybrid tone-interleaved and orthogonal code based EHT-LTF symbol transmission. A hybrid orthogonality mechanism may be used to differentiate EHT-LTF symbols from multiple APs, i.e., tone-interleaved and orthogonal code hybrid. FIG. 21 shows an example to illustrate how hybrid tone-interleaving and orthogonal code may be applied in EHT-LTF transmissions. In this example, there are 4 cooperating APs. AP1 and AP2 transmit EHT-LTF in the odd tones. AP3 and AP4 transmit EHT-LTF in the even tones. Within the same tone, the EHT-LTF transmission is may be the same as Equation 1.

An alternative sounding protocol, a duplicated single NDP sounding protocol is presented in FIG. 18. In contrast to the single NDP sounding protocol of FIG. 17, the duplicated single NDP sounding protocol enables cooperating APs to send the same NDP as the leading AP over the same bandwidth which is used to request CSI information. The NDP format for the duplicated single NDP sounding protocol is addressed in FIG. 20.

Figure 22:
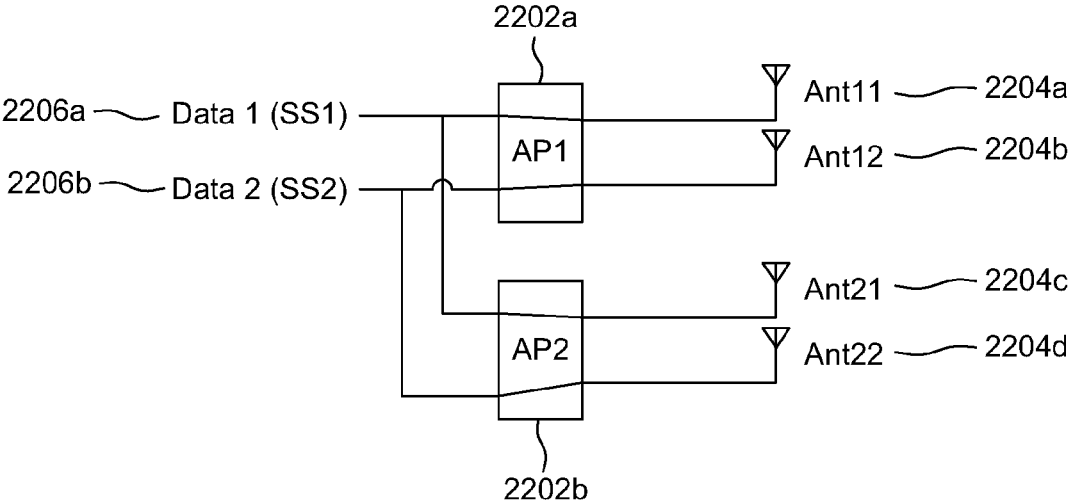
FIG. 22 is a diagram illustrating a joint transmission scheme using multiple APs.

FIG. 22 illustrates a joint transmission scheme using multiple APs 2202a and 2202b. In one joint transmission scheme, data for multiple STAs is available in multiple APs with the same number of Tx antennas. A pair of antennas from two different APs may form a combined antenna and transmit the same signal. For example, AP1 has two physical antennas with indices Ant11 2204a and Ant12 2204b. AP2 has two physical antennas with indices Ant21 2204c and Ant22 2204d. Then, the antenna pair (Ant11 2204a, Ant21 2204b) and antenna pair (Ant21 2204c, Ant22 2204d) may form a set of new Tx antennas, referred to as inter-AP Antennas or inter-AP Antenna ports, in which Ant11 2204a and Ant21 2204b may transmit the same signal. Likewise, Ant21 2204c and Ant22 2204d may transmit the same signal.

As shown in FIG. 22, SS1 2206a and SS2 2206b are two spatial streams or two independent data sets. To achieve such a transmission scheme, there is no need to obtain CSI for each Tx-Rx antenna pairs. Only the CSIs between an inter-AP Tx antennas and a Rx antennas are needed.

Figure 23:
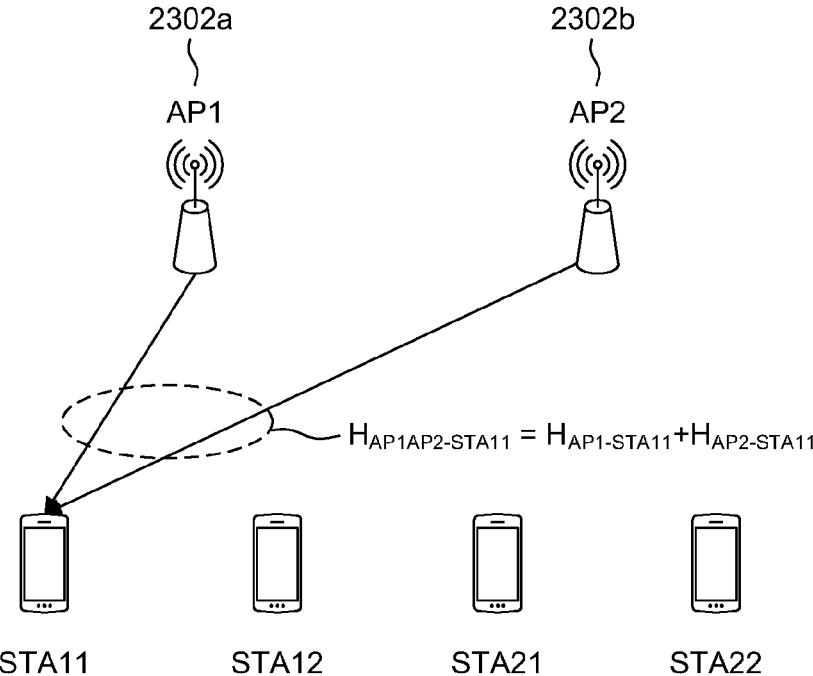
FIG. 23 is diagram illustrating CSI between an inter-AP antenna and a STA.

FIG. 23 shows an example, in which $H_{AP1AP2-STA11}=H_{AP1-STA11}+H_{AP2-STA}11$ is needed to be obtained, but not $H_{AP1-STA}11$ and $H_{AP2-STA11}$, individually. To obtain the combined CSI, e.g., $H_{AP1AP2-STA11}$, the sounding signals from different APs 2302a and 2302b need to be transmitted at the same time.

Figure 24:
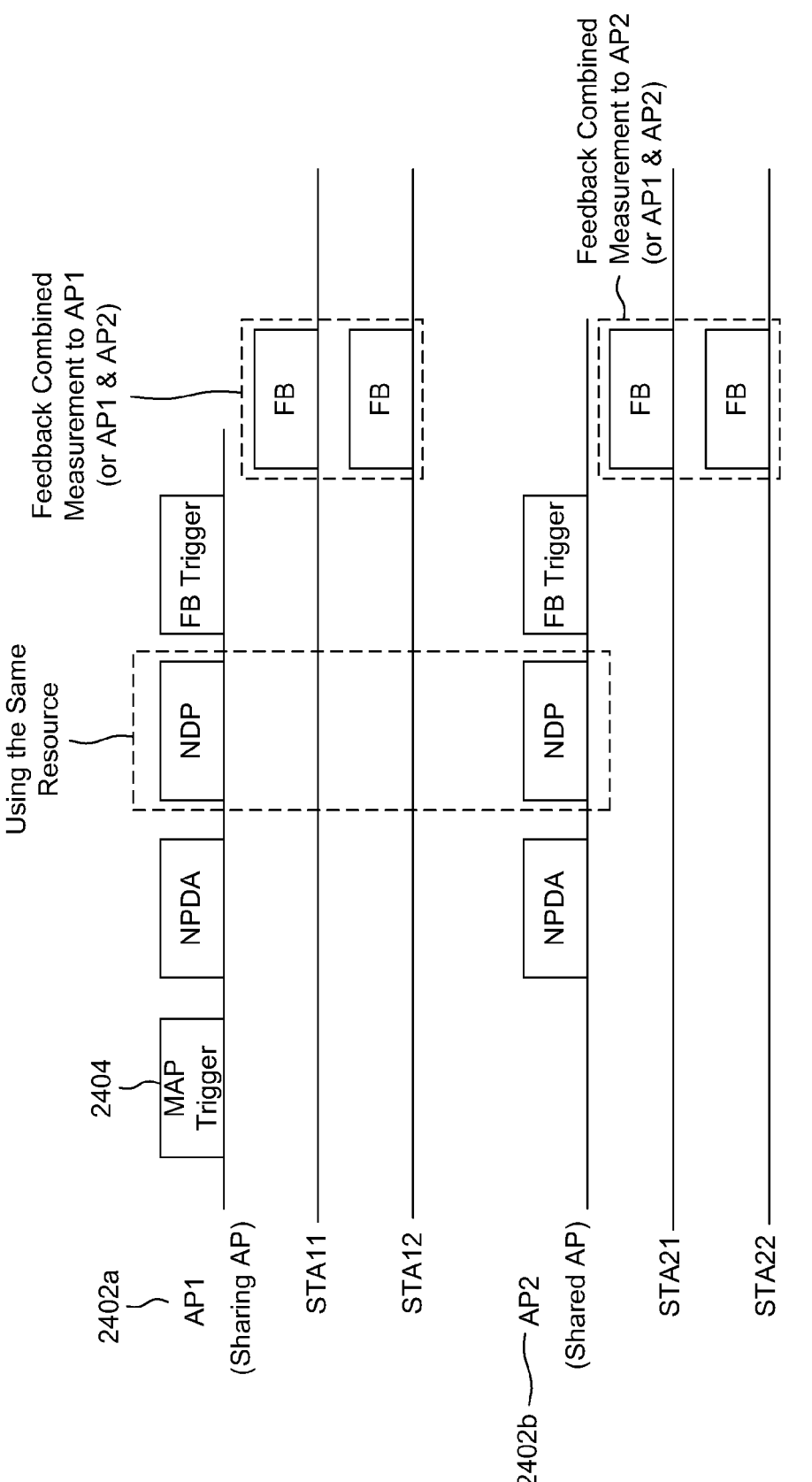
FIG. 24 is diagram illustrating an example of a procedure to enable combined channel sounding.

FIG. 24 illustrates an example of a procedure to enable combined channel sounding. To achieve simultaneous transmission, the Sharing AP (AP1) 2402a in the coordinated AP set sends a MAP Trigger frame 2404, which may contain the following information: (1) IDs of the shared Aps; (2) resources used by APs in the coordinated AP set (including, but not limit to, frequency resource units and/or the order of transmission of NDPA and FB triggers, and/or the number of Tx antennas); and (3) cyclic shift diversity (CSD) setup for each AP. Because each spatial stream may be transmitted from antennas in different APs, one of the APs (e.g., the sharing AP) may not need to use CSD for all of its antennas. However, all other antennas in other APs may need to have CSD setup, and the CSD values for all antennas in each AP may be the same.

After MAP Trigger frame 2404 is transmitted, after SIFS, all APs (e.g., 2402*a* and 2402*b*) may follow the existing trigger frame based sounding procedure to obtain the CSI. Since NDP frames transmitted from different APs use the same time-frequency resource, the CSI measured from all STAs would be the one combined from different APs. The aforementioned method may be applied to per-BSS SU MIMO, where "BF Trigger may not be needed.

Figure 25:
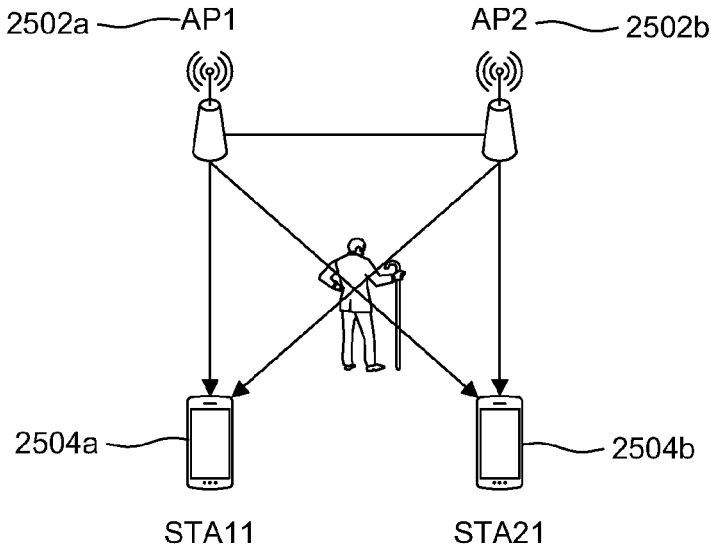
FIG. 25 is diagram illustrating an example of wireless sensing.

Furthermore, the aforementioned method may be applied to wireless sensing purpose. FIG. 25 depicts an example, where AP1 2502*a* and AP2 2502*b* are coordinated sensing waveform transmitters which may transmit the NDP frames or any frames with sensing signals at the same time. STA11 2504*a* and STA21 2504*b* are sensing waveform receivers that may measure the channel variation and may compute a metric that may be useful for certain sensing applications. The specific type of measurements for sensing may be included the "MAP Trigger" frame.

Figure 26:
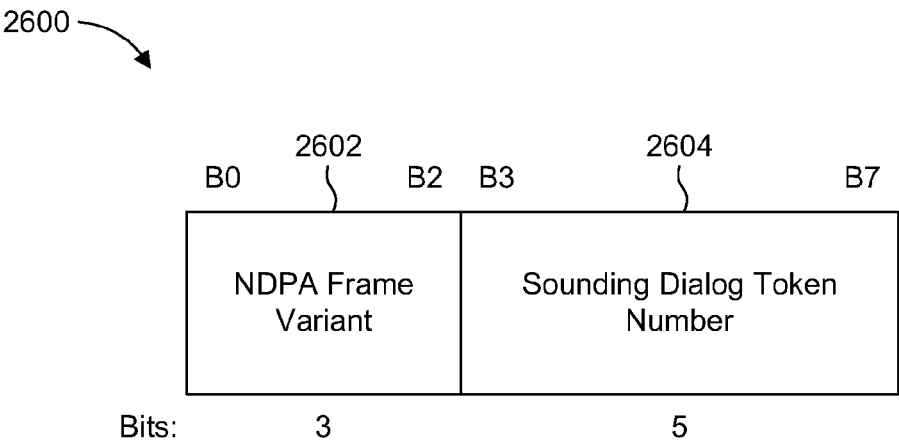
FIG. 26 is an example of a Sounding Dialog Token for Future Compatible NDPA.

In one embodiment, the Sounding Dialog Token field in the NDPA frame may be redesigned such that 3 or more bits may be used to indicate the NDPA frame variant for future amendments (such as 802.11 bf). FIG. 26 and Table 3 indicate one possible design in case of using 3 bits in the Sounding Dialog Token.

As shown in FIG. 26, the Sounding Dialog Token field in the NDPA frame 2600 may include a NDPA Frame Variant subframe 2602 and Sounding Dialog Token Number 2604. The NDPA Frame Variant subframe 2602 may be 3 bits. The Sounding Dialog Token Number 2604 may be 5 bits.

As shown in Table 3, in this design B2 or B7 of the Sounding Dialog Token may be used together with B0 and B1 to indicate the NDPA frame variant.

TABLE 3

| Example of an Indication of the NDPA Frame Variant with 3 Bits in the Sounding Dialog Token | | | |
| --- | --- | --- | --- |
| NDPA Variant Subfield | | | |
| B0 | B1 | B2/B7 | NDPA Frame Variant |
| 0 | 0 | 0 | VHT NDPA |
| 0 | 1 | 0 | HE NDPA |
| 1 | 0 | 0 | Ranging NDPA |
| 1 | 1 | 0 | Reserved |
| 1 | 1 | 1 | EHT NDPA |
| 0 | 0 | 1 | MAP NDPA |
| 0 | 1 | 1 | SENS NDPA |
| 1 | 0 | 1 | Reserved |

In one embodiment, the current design of the Sounding Dialog Token field with 2 bits to indicate the NDP frame variant may be used such that the setting of the bits (B0 B1=1 1) is used to indicated EHT or EHT+frame variant. In one method, one or more reserved bits in the STA Info field may be used to indicate the amendment version for beyond EHT such that the default values for those bits may indicate EHT and other values may indicate other future amendments such as SENS. In this example, the version information may be different for different STAs. Accordingly, the NDPA may be used to signal or solicit the transmission of NDP from STAs which implement different future amendments including EHT and beyond (e.g. SENS).

In another method, a Special STA Info field may be defined with a special AID11 to signal common information for all the STAs in the NDPA frame. This Special STA Info field may be used to signal the version of the intended amendment such as EHT or SENS or any other future amendment. In one alternative, only one Special STA Info field may be included in the NDPA frame and may be placed just after the Sounding Dialog Token field as the first STA Info field. In this case, only STAs from the same amendment may be signaled in the same NDPA. In another alternative, two or more Special STA Info field may be included in the NDPA to signal STAs from different amendments. In this alternative, each Special STA Info field may indicate that the following STA Info fields are all from the same amendment.

Figure 27:
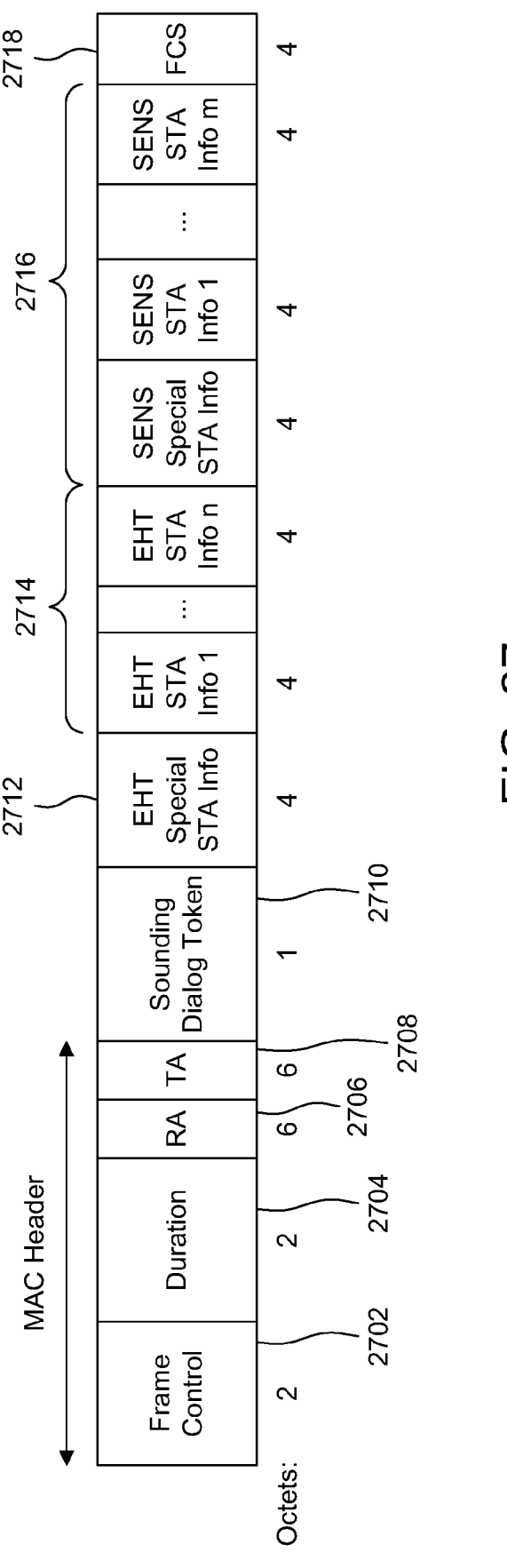
FIG. 27 is an example of a NDPA variant design with two Special STA Info to signal EHT STAs and SENS STAs in the same frame.

An example of this alternative is indicated in FIG. 27 where two Special STA Info fields 2700 are used to signal EHT STAs and SENS STAs in the same NDPA. The Special STA Info fields 2700 may include a Frame Control frame 2702, Duration frame 2704, RA frame 2706, TA frame 2708, Sounding Dialog Token frame 2710, EHT Special STA Info field 2712, one or more EHT STA Info fields 2714, one or more SENS Special STA info field 2716, and FCS field 2718.

In one embodiment, a new Control frame may be defined as NDPA+ for future amendments (e.g. beyond EHT). In this new NDPA, the Sounding Dialog Token may be designed to indicate the amendment version using two or more bits.

In one embodiment, one or more bits (which may be referred to as a MAP field) in the U-SIG of the EHT MU PPDU may indicate that this PPDU is intended to STAs in both the in-BSS and the OBSS. In one example, an NDPA frame may be carried by the PPDU, and this may allow for the early detection that the NDPA may carry signaling for the OBSS STAs in this sounding/sensing procedure. In another example, a Trigger Frame may be carried by the PPDU and this may allow for the early detection that the Trigger Frame may solicit feedback form OBSS STAs in this sounding/sensing procedure.

A non-AP STA may use the following early determination procedure. A non-AP STA may receive a PPDU, and the STA may check the BSS Color in U-SIG field of the PPDU. If the BSS Color indicates the PPDU may be transmitted from an OBSS (i.e., the PPDU may be identified as an inter-BSS PPDU), the STA may continue checking the MAP field. If the MAP field is set (indicating the PPDU is for MAP transmissions), the STA may continue decoding the entire PPDU. A RXVECTOR parameter MAP_OPERA-TION may be defined based on the value set in MAP field in U-SIG field. For example, MAP_OPERATION may be set to 1 if MAP field is set; and 0 otherwise. When MAP_O-PERATION is 1 and the PPDU is an inter-BSS PPDU, the STA may not update its basic NAV based on the RXVEC-TOR parameter TXOP_DURATION unless it determines that it is not the intended receiver of the PPDU later on during the continuing decoding of the PPDU.

Otherwise, the STA may not need to decode the entire PPDU. The STA may set basic NAV and go to doze mode until the end of the PPDU or based on the setting in the TXOP duration field.

In one embodiment, STAs supporting the sensing function (11bf amendment) may always ignore the Sounding Dialog Token in the NDPA signaling the STAs participating in the sensing or may ignore it only when the NDPA frame is transmitted under a sensing management setup and before its termination. In one method, these rules may be applied to any STAs which supports any amendment after 802.11be.

In one embodiment, an MU beamformer may solicit full bandwidth CQI feedback from an MU/SU beamformee in an EHT non-TB sounding sequence if the SU/MU beamformee indicates support by setting the Non-Triggered CQI Beamforming Feedback subfield in the EHT PHY Capabilities Information field to 1.

Alternatively, an MU beamformer may solicit partial or full bandwidth CQI feedback from an MU/SU beamformee in an EHT non-TB sounding sequence if the SU/MU beamformee indicates support by setting the Non-Triggered CQI Beamforming Feedback subfield in the EHT PHY Capabilities Information field to 1 when an enhanced definition of Non-Triggered CQI Feedback subfield in the EHT PHY Capabilities Information field is defined. The enhanced definition of Non-Triggered CQI Feedback subfield is given as follows: (1) for an AP, indicates support for the reception of partial bandwidth and full bandwidth non-triggered CQI feedback; (2) for a non-AP STA, indicates support for the transmission of partial bandwidth and full bandwidth non-triggered CQI feedback; (3) set to 0 if not supported; and/or set to 1 if supported In an EHT non-TB sounding sequence case, the occupied subchannel(s) indicated by the BW field and Puncturing Channel Information fields in the U-SIG of NDP may be the same as the requested subchannels(s) indicated in Partial BW Info subfield in the EHT NDP Announcement frame. In an EHT non-TB sounding sequence case, the requested subchannel(s) in the Partial BW Info subfield in the EHT NDP Announcement frame may not include any subchannel indicated in the Disabled Subchannel Bitmap field in the EHT Operation element. Alternatively, the requested subchannel(s) indicated in the Partial BW Info subfield in the EHT NDP Announcement frame may be the same or a subset of the subchannels allowed by the EHT Operation element.

In an EHT non-TB sounding sequence case, there are multiple scenarios with different requested channel patterns.

In one instance, when the requested subchannels indicated in the Partial BW Info subfield in the EHT NDP Announcement frame are the same as the allowable subchannels indicated in the beacon frame but do not include any subchannel indicated in the Disabled Subchannel Bitmap field in the EHT Operation element, the punctured subchannels indicated in the Punctured Channel Information subfield of the U-SIG field of the EHT MU PPDU that carry the CSI/CQI feedback may have the same as, or more punctured subchannels than those indicated in the beacon frame. Or the occupied subchannels indicated in the Punctured Channel Information subfield of the U-SIG field of the EHT MU PPDU that carries CSI/CQI feedback may be same or the subset of the request subchannels indicated in the Partial BW Info subfield in the EHT NDP Announcement frame.

In another instance, when the requested subchannels indicated in the Partial BW Info subfield in the EHT NDP Announcement frame are the subset of the allowable subchannels indicated in the beacon frame, the occupied subchannels indicated in the Punctured Channel Information subfield of the U-SIG field of the EHT MU PPDU that carries CSI/CQI feedback may include the same or fewer or more than requested subchannels indicated in the Partial BW Info subfield in the EHT NDP Announcement frame. However, the subchannels used in the EHT MU PPDU that carry the CSI/CQI feedback may not include any subchannel indicated in the Disabled Subchannel Bitmap field in the EHT Operation element. Trigger frames may be designed in a way that it may be reused for future versions. The Trigger frame designs disclosed here may be used to trigger PPDUs from a future version. Here future versions may be any 802.11 amendment after 11be.

Trigger frame may carry one or more Special User Info field. The Special User Info field may carry some common information to all the users or a subset of users. Each Special User Info field may carry information to a subset of users with a common PHY versions.

In one method, the Special User Info fields may be identified by a special AID (e.g., AID=2007). Each Special User Info field carries a PHY version ID (PVID) subfield which may indicate a PHY version (e.g., 11be/EHT version). In one method, this subfield may be generalized to indicate any version starting from 11be (not only a version with PHY, e.g., 11be, 11bf etc.). User Info fields following the Special User Info field may respond with a TB PPDU defined in the corresponding version.

Figure 28:
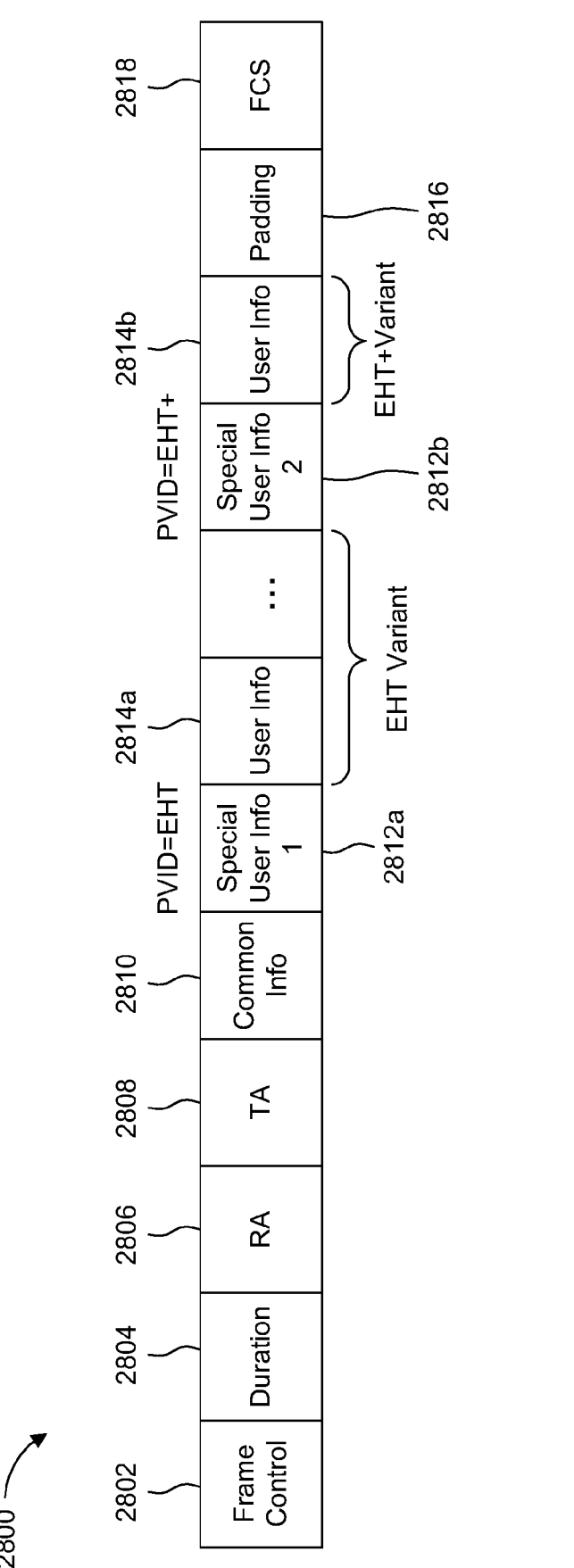
FIG. 28 is an example of a forward computable Trigger frame design I.

FIG. 28 illustrates an example of a forward computable Trigger frame design 2800. As shown in FIG. 28, in one design, a forward computable Trigger frame design may include a Frame Control field 2802, Duration field 2804, RA field 2806, TA field 2808, Common Info field 2810, Special User Info 1 field 2812a, User Info field 2814a, Special User Info 2 field 2812b, User Info field 2814b, Padding field 2816, and FCS field 2818.

As shown in FIG. 28, two Special User Info fields may present in the Trigger frame, where the first Special User Info field 2812a may include PVID indicating EHT variant, and the second Special User Info field 2812b may include PVID indicating an EHT+ variant. The STA with AID identified in a User Info field following the first Special User Info field 2812a may respond with EHT TB PPDU. The STA with AID identified in a User Info field following the second Special User Info field 2812b may respond with EHT+ TB PPDU. In this method, the location of the User Info field is used to implicitly indicate which Special User Info field the corresponding user may check.

In one method, the content of the Special User Info field may vary depending on the PVID. A receiving STA may check the PVID subfield in Special User Info field first, and determine the PHY version, and then determine the meaning of each subfields.

In one method, AID and PVID together may indicate an 802.11 version/amendment. For example, the Special User Info fields may be identified by a set of AIDs (e.g., AID= [2007, value1, value2 etc.], we may assume M AIDs are defined to carry Special User Info fields). And Each AID value may be used to represent N PVIDs. In this example, N×M different 802.11 version/amendments may be carried.

Figure 29:
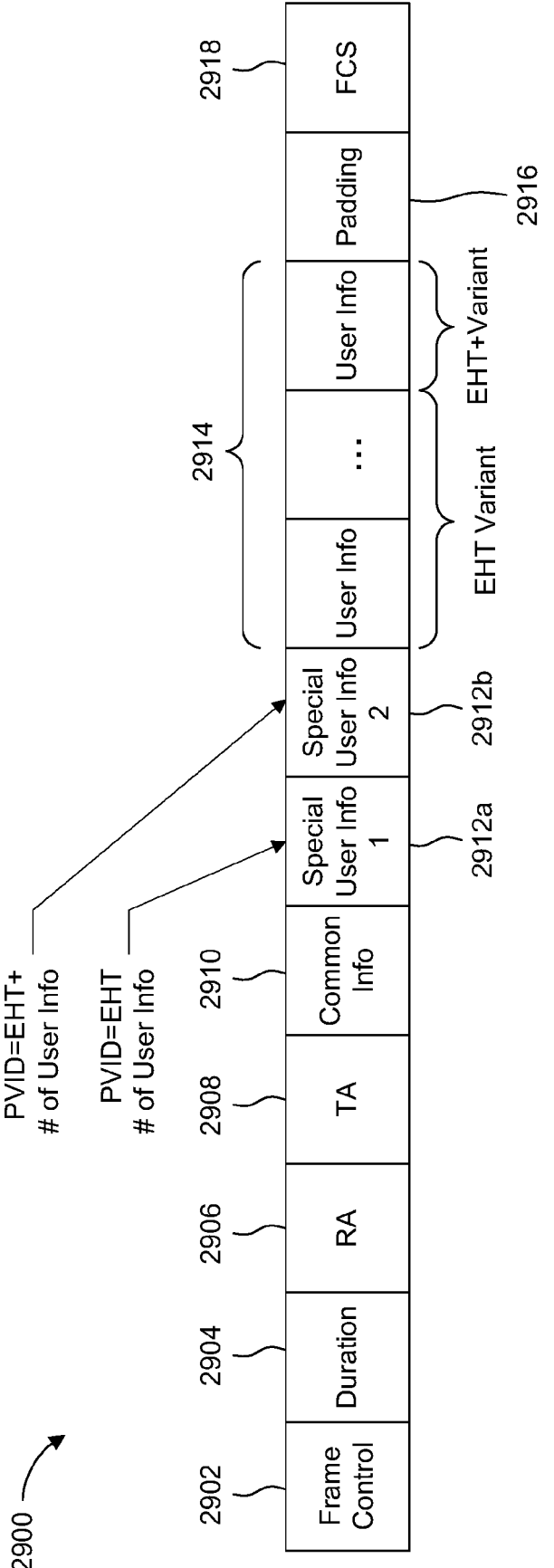
FIG. 29 is an example of a forward compatible Trigger frame design II.

FIG. 29 illustrates another example of a forward compatible Trigger frame design 2900. As shown in FIG. 29, in one design, a forward computable Trigger frame design may include a Frame Control field 2902, Duration field 2904, RA field 2906, TA field 2908, Common Info field 2910, Special User Info 1 field 2912a, one or more User Info field 2914, Special User Info 2 field 2912b, Padding field 2916, and FCS field 2918.

As shown in FIG. 29, all the Special User Info fields may be carried right after the Common Info field. User Info fields may follow after the Special User Info fields.

Each Special User Info field may carry a subfield to indicate the number of User Info fields which may have the same format as indicated in the PVID. The User Info field may be in the order to carry User Info fields with PVID1 (the PVID carried in the first Special User Info field) first, and then followed by the User Info fields with PVID2 (the PVID carried in the second Special User Infor field) and so on.

In one method, the Version ID/PVID may be carried in Common Info field or a variant of Common Info field (e.g., EHT variant). In one method, one Version ID/PVID value may be identified in the Common Info field and thus the Trigger frame may be used to trigger one 802.11 version. In one method, a bitmap of Version ID/PVID may be carried in the Common Info field and each bit may indicate the presence of one version in the Trigger frame.

In 802.11, implicit sounding procedure is defined to enable STA A (Beamformer) to solicit a sounding NDP from STA B (Beamformee). In this procedure, a sounding NDP may be solicited from a single STA only.

In one embodiment, trigger-based implicit sounding may be enabled by designing a Trigger NDPA such that multiple STAs may be triggered to send sounding NDP in the uplink. Also, uplink sounding may be enabled to allow for uplink beamforming. In uplink sounding, the AP may use the Trigger NDPA to solicit sounding NDP transmission from multiple non-AP STA(s) in the uplink. The AP may then compute the beamforming feedback and send it to the non-AP STAs. In uplink beamforming, the non-AP STAs (beamformers) may send beamformed data based on the beamforming feedback sent from the AP (beamformee).

Figure 30:
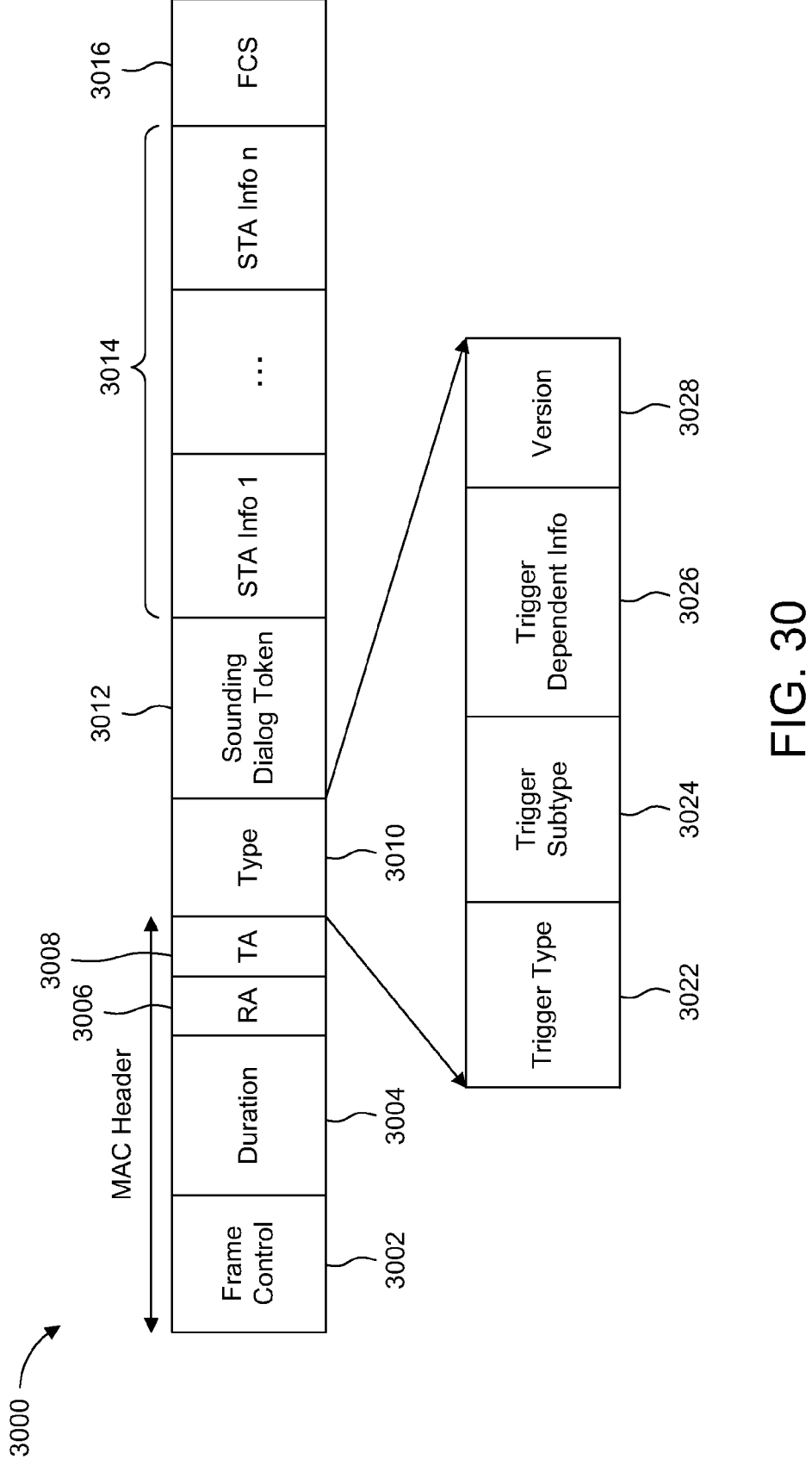
FIG. 30 is an example of a design of the Type Field in the Trigger NDPA.

In one embodiment, a new control frame (Trigger NDPA) may be defined with a new Frame Control index to indicate a Trigger NDPA frame type. FIG. 30 illustrates an example of a design of the Type Field 3012 in the Trigger NDPA frame 3000. The Trigger NDPA may include a Frame Control field 3002, Duration field 3004, RA field 3006, TA field 3008, Type field 3010, Sounding Dialog field 3012, one or more STA Info fields 3014, and FCS field 3016. Further, as shown in FIG. 30, the Type field 3010 may include a Trigger Type subfield 3022, Trigger Subtype subfield 3024, Trigger Dependent Info subfield 3026, and Version Information subfield 3028. The Trigger NDPA frame 3000 may have the same design of the current NDPA and additionally include another field (Type field 3010=1 or more octets) to provide more signaling such as: (1) Trigger Type 3022; (2) Trigger Subtype 3024; (3) Trigger Dependent Information 3026; and (4) Version Information 3028.

Many trigger types may be defined to provide different functionalities, including, implicit sounding NDP transmission, uplink sounding NDP transmission, sensing NDP transmission, and machine learning/federated learning model update.

The Trigger Subtype subfield 3024 may provide more information related to the Trigger Type 3010 such as Sequential NDP, Joint NDP with Orthogonal Codes, Interleaved NDP, etc. In one example, The Implicit Sounding NDP may be sent sequentially in different times in the entire bandwidth, jointly in different frequency subchannels, jointly in the entire bandwidth but with different orthogonal codes, or jointly in the entire bandwidth with different subcarrier groups (Interleaved NDP).

The Trigger Dependent Information subfield 3026 may signal more information specific to each Trigger NDPA type and/or subtype. In one example, in Interleaved NDP, we may indicate how many subcarriers groups will be used and the subcarrier list in each subcarrier group. In another example, we may use this subfield to provide more information related to ML/FL model updating (e.g., the ML model type, the size of the model, the number of quantization levels of the gradients, etc.)

The Version Information subfield 3028 may indicate the version of the 802.11 amendment.

In another embodiment, one bit of the Sounding Dialog Token field 3012 may be may be used to indicate that the NDPA frame is a Trigger NDPA, accordingly, the signaled STAs may parse the STA Info field as a trigger based NDPA and not a traditional NDPA. In another embodiment, one bit in the STA Info field may be used to indicate the NDPA frame is a Trigger NDPA.

Figure 31:
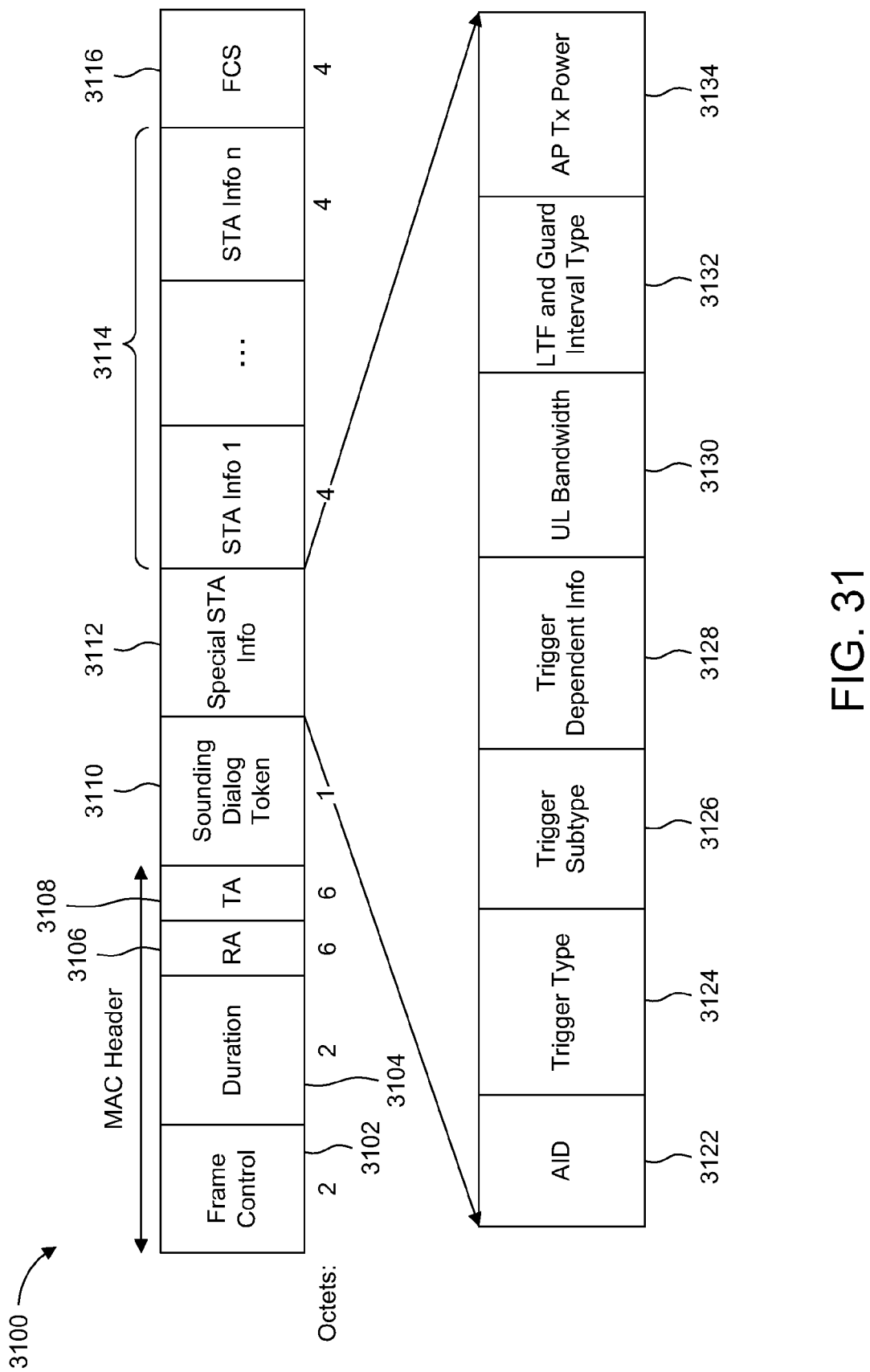
FIG. 31 is an example of a design of the Special STA Info field.

FIG. 31 is an example of a Trigger NDPA 3100 with a Special STA Info field 3112. As shown in FIG. 31, the Trigger NDPA 3100 may include a Frame Control field 3102, Duration field 3104, RA field 3106, TA field 3108, Sounding Dialog field 3110, Special STA Info field 3112, one or more STA Info fields 3114, and FCS field 3116.

The Special STA Info field 3010 may include a AID subfield 3122, Trigger Type subfield 3124, Trigger Subtype subfield 3126, Trigger Dependent Info subfield 3128, UL Bandwidth subfield 3130, LTF and Guard Interval Type subfield 3132, and AP Tx Power subfield 3134.

As depicted in FIG. 31, in one embodiment, some special IDs may be used to indicate a Special STA Info field 3112 which may be used to signal Common information for all the triggered STAs in the Trigger NDPA such as: (1) AID11; (2) Trigger Type; (3) Trigger Subtype; (4) Trigger Dependent Information; (5) UL Bandwidth; (6) LTF and Guard Interval Type; and (7) AP Tx Power.

The AID11 subfield 3122 may be a Special STA ID to identify that this STA Info field is Special STA Info field and the information signaled in it is common for all the signaled STAs in the Triggered NDPA. The Trigger Type subfield 3124 may be an alternative or additional option to indicate the Trigger NDPA type (e.g., Implicit Sounding, Uplink Sounding, etc.). The Trigger Subtype subfield 3126 may be an alternative or additional option to indicate the Trigger NDPA Subtype (e.g., Sequential NDPA, Interleaved NDPA, etc.). The Trigger Dependent Info subfield 3128 may be an alternative or additional option to indicate information specific to each Trigger NDPA type and/or subtype. The UL Bandwidth subfield 3130 may indicate the BSS operating bandwidth. The LTF and Guard Interval Type subfield 3132 may indicate the LTF and the Guard Interval type. The AP Tx Power subfield 3134 may indicate the AP transmit power for Pathloss calculation purposes.

In one embodiment, The STA Info field of the Trigger NDPA may include the following subfields: (1) AID; (2) BW Allocation; (3) Nt; (4) Number of LTFs; (5) Disambiguation; and (6) UL Target Receiver Power.

The AID subfield may be an Association ID to identify the STA intended by this STA Info field. The BW Allocation subfield may indicate allocation of the bandwidth in which the intended STA will transmit an NDP. The bandwidth allocation may be parsed differently based on the type of the Trigger NDPA which may be indicated in the Type field or in the Trigger Type subfield of the Special STA Info field. In one example, in case of Interleaved NDP, the Bandwidth Allocation subfield may indicate the subcarrier groups allocated to each STA. In another example of NDP transmitted jointly with different orthogonal codes, the Bandwidth Allocation subfield may indicate the allocated orthogonal code (sequence). In yet another example, in case of sequential NDP, the bandwidth allocation may indicate the relative time in which a STA shall transmit its NDP. In case of ML/FL model update, the NDPs may be transmitted in non-orthogonal mode to allow for the aggregation of the model gradients in the air. In this scenario, the bandwidth allocation subfield may be used to signal more information related to this specific scenario such as the number of gradient quantization levels, the number of expected LTFs, the number of expected NDPs, etc.

The Nt subfield may indicate the number of antennas used for the transmission of the NDP in the uplink. The number of LTFs may indicate the number of LTFs in the NDP in case the transmission of extra LTFs is allowed to improve the accuracy of the channel estimation. The Disambiguation subfield may indicate backward compatibility with legacy VHT STAs. The UL Target Receive Power subfield may indicate the target receive power at the AP for power control purposes.

In one embodiment, the CSI Feedback (Beamforming Reports) in uplink sounding scenario may be sent back to the non-AP STAs in different ways, either addressed individually, aggregated in one A-MPDU, or aggregated in one Multi-STAs Compressed Beamforming/CQI report.

In one method, the beamforming report of each non-AP STA may be sent in a different PPDU such that the current Compressed Beamforming/CQI frame may be used as is. In this method, each beamforming report may be addressed individually to the receiving non-AP STA.

In another method, several beamforming reports may be aggregated in one A-MPDU which might be addressed to a broadcast or a groupcast address. In this method, another field may be added to the Compressed Beamforming/CQI frame to identify the non-AP STA for which the report is sent. Also, we may need another field to signal that several beamforming reports are aggregated in on A-MPDU.

In yet another method, the Compressed Beamforming/CQI report may be redesigned to aggregate multiple reports in one frame (i.e., Multi-STA Compressed Beamforming/CQI frame). In this method, the number of aggregated beamforming reports may be signaled in the MIMO Control field and the beamforming reports may be stacked in an increasing order of the AIDs of the STAs signaled in the triggered NDPA sounding. In one example, a new field may be added to the Compressed Beamforming/CQI frame to indicate the AID of the STA just before the fields of the beamforming report corresponding to this STA in the aggregated report. In another example, a new field may be added to the Compressed Beamforming/CQI frame to map the stacked beamforming reports to corresponding STAs which are signaled in the Trigger-NDPA used to initiate the sounding procedure.

Because the non-AP STAs will not send feedback in the uplink, then there is no need to indicate the feedback type or codebook size in the STA Info field. However, in the case of uplink beamforming, the non-AP STAs may need information about the feedback type and codebook size to parse the beamforming feedback report. This information may be signaled in the MIMO Control field of the Compressed Beamforming/CQI frame.

Figure 32:
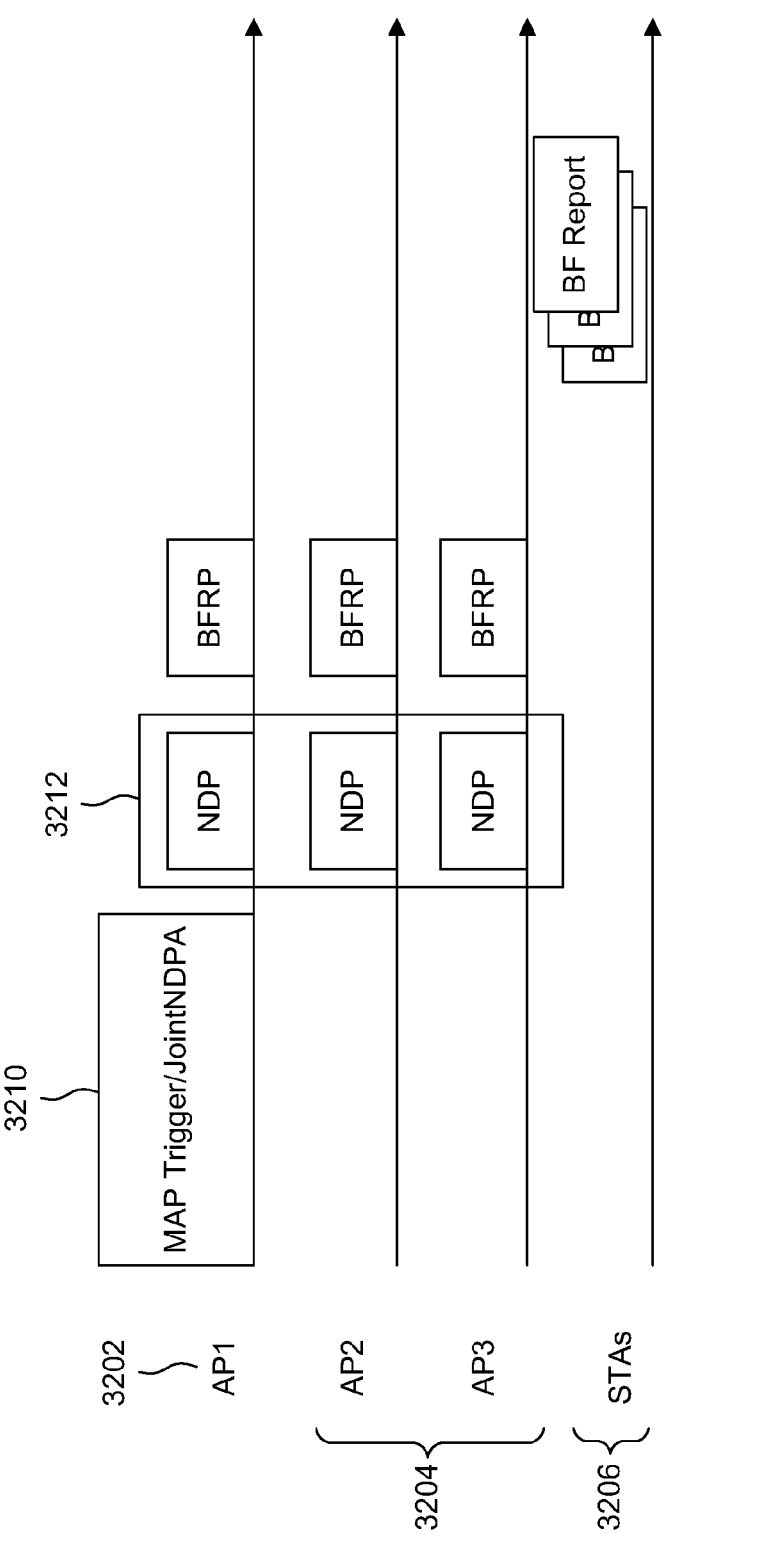
FIG. 32 is an example of a MAP sounding procedure.

Multiple APs may jointly or coordinately transmit to a group of STAs. FIG. 32 illustrates an example of a compact MAP sounding procedure where a sharing AP 3202 may transmit a MAP Trigger frame or Joint NPDA frame 3210 to trigger concurrent NDP transmissions 3212 from multiple APs 3204 and instruct STAs 3206 to perform sounding.

The sharing or the leading AP 3202, may transmit a MAP Trigger/JOINT NDPA frame 3210. This frame may be used to trigger NDP frames transmissions from multiple APs 3204. Meanwhile, the MAP Trigger frame/NDPA 3210 may carry information for the STAs 3206 to perform sounding measurement and report. In one method, the Trigger/NDPA frame 3210 transmitted from the sharing AP 3202 may carry a subfield to indicate that more MAP Trigger/NDPA frame 3210 may be transmitted from the shared APs 3204 in the case that some intended STAs 3206 may not hear the transmission of the sharing AP 3202.

The Sharing AP and Shared APs, e.g., AP1, AP2 and AP3, may transmit NDP frames concurrently or sequentially. When the shared APs transmit the NDP concurrently, the NDP frame may need to be transmitted orthogonally in frequency or spatial domain. For example, P matrix (or other orthogonal matrix) may be applied to the LTF symbols of the NDP frames among shared APs. In another example, LTF symbols may be transmitted on interlaced populated sub-carriers. The Sharing AP and/or Shared APs may transmit BFRP frames concurrently or sequentially to allocate resources to STAs for beamforming report. The STAs may transmit a BF report.

Considering MAP joint/coordinated transmission, different type of communications between shared AP and sharing APs may be needed. In one method, Trigger frame may be used by an AP to trigger transmissions from multiple APs. In the example shown in FIG. 32, The Trigger frame is used to trigger NDP transmissions from multiple APs. However, the Trigger frame may be used to trigger other type of frame transmissions from multiple APs.

In one method, a new Trigger Type value may be defined to indicate MAP trigger. The Trigger Type subfield may be carried in the Common Info field in Trigger frame. With the Trigger Type subfield set to MAP trigger, the User Info fields may carry information for MAP related communications.

The User Info field may carry: (1) AP ID and (2) MAP Trigger Subtype. The AP ID subfield may carry AP ID. In one method, the size of the AP ID subfield may depend on the number of APs in the multi-AP set.

There may be multiple MAP Trigger frame subtypes. The MAP Trigger Subtype field may be used to carry MAP Trigger frame subtypes. For example, there may be MAP basic trigger, MAP NDP trigger (this may be used for MAP sounding, MAP NDP feedback etc.), MAP aggregated buffer status report trigger (this may trigger shared AP to report the aggregated buffer status for the BSS). In one method, the MAP Trigger Subtype may be combined and indicated in Trigger Type subfield in Common Info field.

In the case the Trigger type and MAP Trigger Subtype may indicate MAP NDP trigger, the User Info field may also carry one or more of the following subfields: (1) BW for each AP; (2) Punctured Channel Information; (3) SS Allocation; (4) Primary Channel; (5) Repeated Transmission; and (6) TB PPDU Type.

The BW for each AP subfield may indicate the operation bandwidth or bandwidth for the NDP transmission for each AP. In one method, this subfield may be different from one User Info field to another which enable different operation bandwidth/NDP bandwidth for different AP in the MAP set. The UL BW subfield in Common Info field may be used to setup the bandwidth field in signaling field of the NDP PPDU. In an alternative method, all the APs may follow the instruction of the sharing AP and use the same BW to transmit the NDP frame. In this case, UL BW subfield in Common Info field may be used to indicate the bandwidth of the NDP transmission.

The Punctured Channel Information for each AP subfield may indicate the punctured channel(s) for each AP. The AP identified by the AP ID may not transmit NDP frame in the punctured channel(s). This subfield may be especially needed when NDP frames from multiple APs may be transmitted concurrently and thus the subchannels punctured by one AP may be used to transmit by another AP. Without this subfield, a non-AP STA may not know who is transmitting on each subchannel. In one method, a bitmap may be used to indicate the punctured channel for each AP. In one method the bitmap size may be predefined and each bit may indicate whether the corresponding subchannel is punctured. The subchannel resolution may depend on the total operation bandwidth of the sharing AP. For example, an 8-bit bitmap may be used to indicate the punctured channel bitmap. If the sharing AP is operated on 160 MHz channel or below, each bit may indicate a puncture scenario on a 20 MHz (determined by equation max (20,BW/8)) subchannel. If the sharing AP is operated on 320 MHz channel, each bit may indicate a puncture scenario on a 40 MHz (determined by equation BW/8) subchannel.

In one method, the bitmap size may be defined to cover the maximum bandwidth and each bit may be with a fixed subchannel resolution. For example, each bit may indicate the punctured channel scenario on a 20 MHz subchannel. If the maximum supported bandwidth is 320 MHz, then 16 bits may be needed for the bitmap.

The SS Allocation subfield may carry spatial stream allocations for NDP transmissions. This subfield may indicate the starting spatial stream and the number of spatial streams allocated to the AP. The information here may correspond to the columns/rows of P matrix or other orthogonal matrix used to transmit the LTF symbols of the NDP frame.

The Primary channel subfield may indicate the primary subchannel of the AP.

The Repeated Transmission subfield may be set to indicate if the APs (e.g., sharing AP and shared APs, or the shared APs) may repeat the NDPA transmission xIFS time after the Trigger frame transmitted by the sharing AP. In the case the Repeated transmission is set to true, the APs may transmit the NDP frame after the repeated Trigger frame transmission. Repeated transmission may be used when some intended STAs may not be able to receive transmission from the sharing AP.

TB PPDU Type subfield (not shown in Table 5) may be used to indicate the TB PPDU Type (e.g., EHT TB PPDU or HE TB PPDU etc.) the responding AP may use in response to the Trigger frame. Note the Trigger frame design disclosed here may be used to other MAP trigger transmissions other than MAP sounding procedure.

In one method, an MAP NDPA/Joint NDPA frame is transmitted from the sharing AP to trigger concurrent NDP transmissions from shared APs (as shown in FIG. 32). Note when the MAP NDPA/Joint NDPA frame is used in the procedure, the non-AP STAs may process the MAP NDPA/ Joint NDPA/NDP sequence as a conventional sounding procedure. The MAP architecture may allow the communication between any non-AP STAs with any AP or sharing AP in the MAP set. The sharing AP may include instructions for shared AP to concurrently transmit the NDP frames. The sharing AP may include instructions for non-AP STAs which may be part of the MAP sounding procedure to perform sounding measurement and prepare sounding feedback report. An example of a JOINT NDPA frame is shown in Table 4.

The subfield in the Sounding Dialog Token field may be used to indicate the NDPA frame is an Joint NDPA. Other forward compatible methods disclosed may be used to indicate the NDPA frame is an Joint NDPA frame.

The AP Info fields may be used to carry resource allocation information for APs and STAs. An example of a design for an AP Info field is shown in Table 5.

The AID11/APID subfield may be used to uniquely identify an AP in the MAP set. This subfield may also be used to identify the field carrying APID is an AP Info field or a STA Info field. In one method, to distinguish from AID11 field, the APID may have values greater than 2007 or 2048 since AID11 assigned to non-AP STAs may be in the range of [0,2007]. In the case the APID is greater than 2048, the MSB of this subfield may be used to distinguish AP Info field and STA Info field since the MSB of APID may be 1 and MSB of AID11 may be 0.

The format of AP Info field and STA Info field may be different. A receiver may use the AID11/APID subfield to determine the format of the AP Info/STA Info field.

In one method, an AP Info field (e.g., the first AP Info field) may be used to include information of the sharing AP. A special AP ID may be used to identify the sharing AP. The information carried in the AP Info field may be used to set up the Signaling field in NDP PPDU. Shared APs may read information carried in the AP Info field and copy the values in one or more subfields to corresponding subfields in NDP PPDU Signaling field.

The Per AP BW subfield may indicate the operation bandwidth for each AP.

In the AP Info field with APID indicating the sharing AP, this may be the operation bandwidth of the MAP TXOP. The Per AP BW subfield in the AP Info field with APID indicating the sharing AP may be copied to Signaling field in the NDP PPDU.

In the AP Info field with APID indicating a shared AP, this may be the bandwidth for the AP and its associated STAs.

The Punctured Channel Info subfield may carry punctured channel information.

In the AP Info field with APID indicating the sharing AP, this may be the punctured channel information for sharing AP and the entire MAP TXOP.

In the AP Info field with APID indicating a shared AP, this may be punctured channel information for the AP.

The Disambiguation subfield may be used for a legacy STA (e.g., VHT STA) to know it is not a intended receiving STA.

The SS Allocation subfield may carry spatial stream allocations for NDP transmissions.

In the AP Info field with APID indicating the sharing AP, this may indicate the total number LTF symbols in the NDP frame, and number of spatial streams allocated for the sharing AP. Note, the sharing AP may use the first m spatial streams to transmit (corresponding to the first m column or row of P matrix or other orthogonal matrix) the NDP frame if m is the number of spatial streams allocated to the sharing AP.

In the AP Info field with APID indicating a shared AP, it may indicate the starting spatial stream and the number of spatial streams allocated to the AP. The information here may correspond to the columns/rows of P matrix or other orthogonal matrix used to transmit the LTF symbols of the NDP frame.

The Primary channel subfield may indicate the primary subchannel of the AP. In the AP Info field with APID indicating the sharing AP, this may indicate the primary channel for sharing AP and the entire MAP TXOP. In the AP Info field with APID indicating a shared AP, this may indicate the primary channel information for the AP.

The Repeated Transmission subfield may be set to indicate if the APs (e.g., sharing AP and shared APs, or the shared APs) may repeat the NDPA transmission xIFS time after the NDPA transmitted by the sharing AP. In the case the Repeated transmission is set to true, the APs may transmit the NDP frame after the repeated NDPA transmission. Repeated transmission may be used when some intended STAs may not be able to receive transmission from the sharing AP.

The TB PPDU Type subfield (not shown in Table 5) may be used to indicate the TB PPDU Type (e.g., EHT TB PPDU or HE TB PPDU etc.) the responding AP may use in response to the JOINT NDPA frame.

The STA Info field may be used to carry sounding measurement and report information for non-AP STAs. In one example, the STA Info field may be with the same design as in conventional NDPA frame. In one method, the AID11 subfield may be the LSBs for the AID assigned to a STA.

In a transmission involving multiple BSSs, the AID assigned in multiple BSS may have collision. For example, in BSS 1, STA1 may be assigned AID1. In BSS2, STA2 may also be assigned AID1. If AID1 is used in a STA Info field, both STA1 and STA2 may respond. In one method, the value used in AID11 subfield may be a function of AID and APID, i.e., AID11 value=f(AID11, APID11). Here the APID is the APID of the STA associated AP. In one example, AID11 value=XOR(AID11, APID11), or AID11 value=AND (AID11, APID11) or AID11 value=OR(AID11, APID11). Here AID11 and APID11 may be the 11 LSB (or MSB) of the AID and APID respectively. Note this method may be generalized and applied to any frame in which AID is used, e.g., Trigger frame etc. In one method, the STA Info field may follow the User Info field design in Trigger frame.

Note the AP Info field with APID indicating the sharing AP may be named/defined as a Common Info field to carry information to all APs and the information carried in the Common Info field may help setting Signaling fields in the upcoming TB PPDU. In one method, the APID subfield may be set to a predefined or reserved AID value to identify the Common Info field.

Because STA21 3304*c* and STA22 3304*d* are associated with AP2 3302*b*, they decode the NDPA 3306*b* and prepare to receive NDP2 3308*b* from AP2 3302*b*. Because STA12 3304*b* is an OBSS of AP2 3302*b*, it too can decode the NDPA 3306*b* and prepare to receive NDP2 3308*b*.

AP1 3302*a* then transmits NDP1 3308*a* and AP2 3302*b* transmits NPD2 3308*a*. AP1 3302*a* then transmits beamforming report poll (BRFP) 1 3310*a* to STA11 3304*a* and STA12 3304*b*. AP2 3302*b* transmits BFRP2 3310*b* to STA21 3304*c* and STA22 3304*d*. STA11 3304*a* transmit a beamforming (BF) report 3312*a* and STA12 3304*b* transmits a BF report 3312*b* to AP1 3302*a*. STA21 3304*c* transmits a BF report 3312*c* to AP2 3302*b* and STA22 3304*d* transmits a BF report 3312*d* to AP2 3302*b*.

Figure 33:
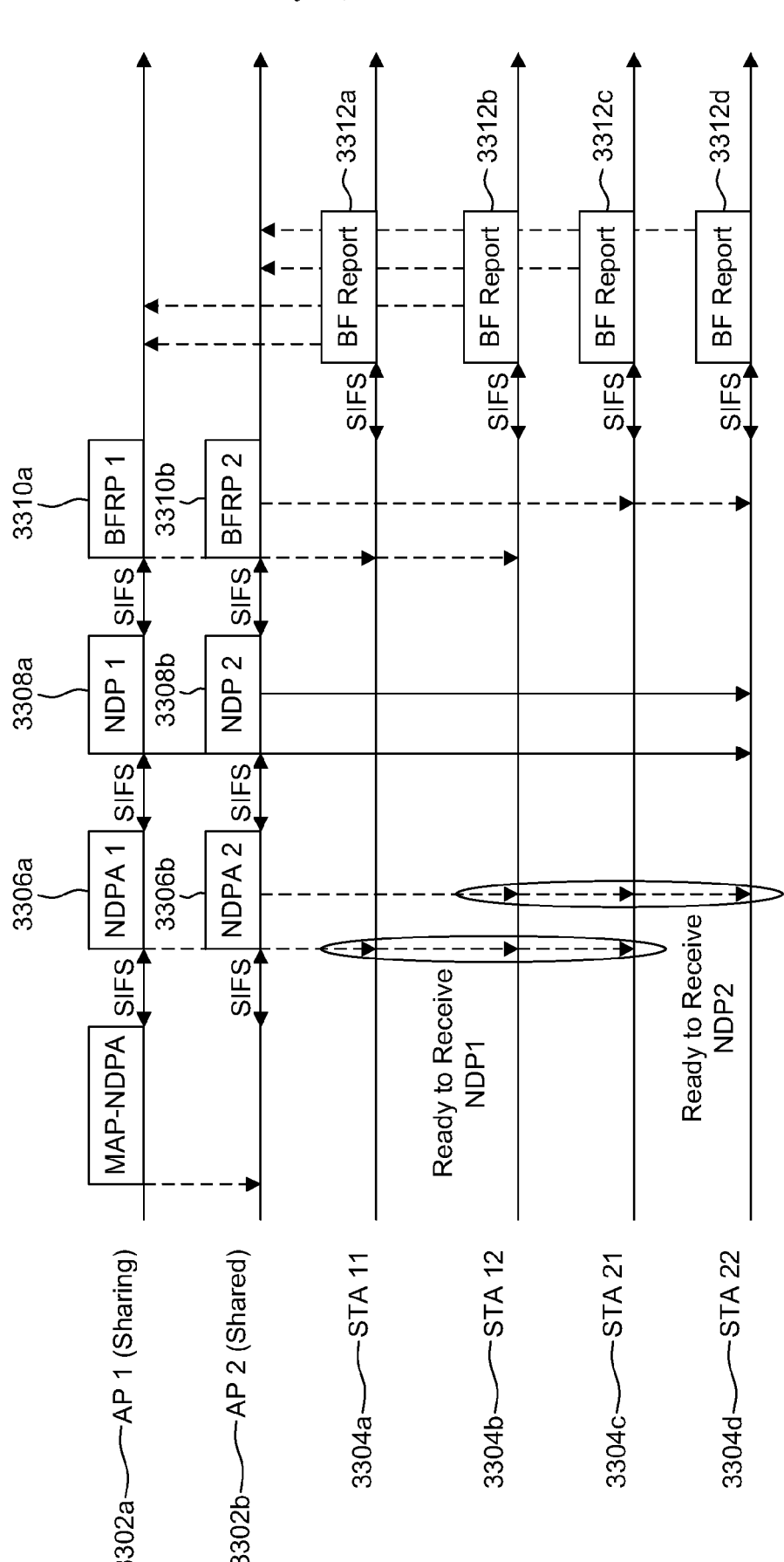
FIG. 33 is an example of a multi-access point sounding procedure.

Further, although not shown in FIG. 33, STA12 3304*b* may transmit the BF report 3312*b* to AP2 3302*b* and STA21 3304*c* may transmit the BF report 3312*c* to AP1 3302*a*.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical

TABLE 4

Example of a JOINT NDPA Frame Design

| Frame Control | Duration | RA | TA | Sounding Dialog Token | AP Info 1 | . . . | AP Info m | STA Info 1 | . . . | STA Info n | FCS |
|---|---|---|---|---|---|---|---|---|---|---|---|

TABLE 5

Example of a Design for an AP Info Field

| APID | Per AP BW | Punctured Channel Info | Disambiguation | SS Allocation | Primary Channel | Repeated Transmission |
|---|---|---|---|---|---|---|

Note the Signaling field of a PPDU mentioned here may be part of the preamble of the PPDU. For example, for a EHT PPDU, the Signaling field mentioned here may be a USIG field and/or a EHT SIG field.

FIG. 33 is a diagram illustrating an example of a multi-access point sounding procedure. As shown in FIG. 33, AP1 3302*a* is the sharing AP and AP2 3302*b* is the shared AP. STA11 3304*a* and STA12 3304*b* are associated with AP1 3302*a*. STA 21 3304*c* and STA22 3304*d* are associated with AP2. STA12 3304*b* is an OBSS of AP2 3302 and unassociated with AP2 3302. STA21 3304*c* is an OBSS of AP1 3302*a* and unassociated with AP1 3302*a*.

During the sounding procedure, AP1 3302*a* transmits an NDPA1 3306*a* and AP2 transmits an NDPA2 3306*b* to all STAs. Because STA11 3304*a* and STA12 3304*b* are associated with AP1 3302*a*, they decode the NDPA1 3306*a* and prepare to receive NDP1 3308*a* from AP1 3302*a*. Because STA21 3304*c* is an OBSS of AP1 3302*a*, it too can decode the NDPA1 3306*a* and prepare to receive NDP1 3308*a*.

media such as CD-ROM disks, and digital versatile disks (DVDs). A processor in association with software may be used to implement a radio frequency transceiver for use in a WTRU, UE, terminal, base station, RNC, or any host computer.

What is claimed:

1. A station (STA) comprising:
   a receiver configured to receive, from an access point (AP), a null data packet announcement (NDPA) frame, the NDPA frame including a Partial BW Info field, wherein the Partial BW Info field indicates one or more requested subchannels; and
   the receiver further configured to receive, from the AP, a null data packet (NDP) frame, the NDP frame including a universal signal (U-SIG) field, which includes a bandwidth (BW) field and a Puncturing Channel Information field;

wherein subchannels indicated by the BW field and Puncturing Channel Information field are the same as the one or more requested subchannels indicated in the NDPA.

2. The STA of claim 1, wherein the receiver is further configured to receive a beamforming report poll (BFRP) from the AP.

3. The STA of claim 1, wherein the STA is participating in a sounding procedure.

4. The STA of claim 1, wherein the one or more requested subchannels do not include subchannels indicated in a Disabled Subchannel Bitmap field included in an Operation element.

5. The STA of claim 1, wherein the one or more requested subchannels are the same subchannels allowed by an Operation element included in a Subchannel Bitmap field.

6. The STA of claim 1, wherein the one or more requested subchannels are a subset of subchannels allowed by an Operation element included in a Subchannel Bitmap field.

7. The STA of claim 1, wherein the NDPA frame includes one or more Special STA Info fields.

8. The STA of claim 7, wherein the one or more Special STA Info fields include an association identifier 11 (AID11) subfield.

9. A method performed by a station (STA), the method comprising:

receiving, from an access point (AP), a null data packet announcement (NDPA) frame, the NDPA frame including a Partial BW Info field, wherein the Partial BW Info field indicates one or more requested subchannels; and receiving, from the AP, a null data packet (NDP) frame, the NDP frame including a universal signal (U-SIG) field, which includes a bandwidth (BW) field and a Puncturing Channel Information field; and wherein subchannels indicated by the BW field and Puncturing Channel Information field are the same as the one or more requested subchannels indicated in the NDPA.

10. The method of claim 9, wherein the receiver is further configured to receive a beamforming report poll (BFRP) from the AP.

11. The method of claim 9, wherein the STA is participating in a multi-AP channel sounding procedure.

12. The method of claim 9, wherein the one or more requested subchannels do not include subchannels indicated in a Disabled Subchannel Bitmap field included in an Operation element.

13. The method of claim 9, wherein the one or more requested subchannels are the same subchannels allowed by an Operation element included in a Subchannel Bitmap field.

14. The method of claim 9, wherein the one or more requested subchannels are a subset of subchannels allowed by an Operation element included in a Subchannel Bitmap field.

15. The method of claim 9, wherein the NDPA frame includes one or more Special STA Info fields.

16. The method of claim 15, wherein the one or more Special STA Info fields include an association identifier 11 (AID11) subfield.

* * * * *